(12) United States Patent
Kuroyanagi et al.

(10) Patent No.: US 6,601,399 B2
(45) Date of Patent: Aug. 5, 2003

(54) ICE MAKING MACHINE

(75) Inventors: Masayuki Kuroyanagi, Aichi-ken (JP);
Teruhiko Otani, Aichi-ken (JP); Hideo Sumikawa, Aichi-ken (JP); Hiroshi Tanaka, Aichi-ken (JP); Yoshio Furukawa, Aichi-ken (JP); Akira Suyama, Aichi-ken (JP)

(73) Assignee: Hoshizaki Denki Kabushiki Kaisha, Toyoake (JP)

( * ) Notice: Subject to any disclaimer, the term of this patent is extended or adjusted under 35 U.S.C. 154(b) by 0 days.

(21) Appl. No.: 10/189,379

(22) Filed: Jul. 8, 2002

(65) Prior Publication Data

US 2003/0010055 A1 Jan. 16, 2003

(30) Foreign Application Priority Data

Jul. 9, 2001  (JP) ......................................... 2001-207456

(51) Int. Cl.[7] ............................................... F25B 49/00
(52) U.S. Cl. .......................... 62/228.2; 62/233; 62/354
(58) Field of Search .......................... 62/354, 135, 137, 62/138, 228.2, 233, 4

(56) References Cited

U.S. PATENT DOCUMENTS 3,969,909 A  *  7/1976  Barto et al. .................... 62/179
4,619,117 A  * 10/1986  Ito ................................ 62/233
4,872,317 A  * 10/1989  Reed ............................. 62/135

FOREIGN PATENT DOCUMENTS

JP            403050476 A  *  3/1991  ................ 62/228.2

* cited by examiner

Primary Examiner—William E. Tapolcal
Assistant Examiner—Mohammad M. Ali
(74) Attorney, Agent, or Firm—Wenderoth, Lind & Ponack, L.L.P.

(57) ABSTRACT

An ice making machine in which upon starting of an ice making operation, a water level detecting switch starts measurement, and a water-supply-stop time T1 is compared with a reference time T2. When the water-supply-stop time T1 is not longer than the reference time T2, it is determined that the ice making machine is an excessive-ice-making state, and control is performed so as to reduce the RPM of a fan motor for cooling a condenser.

16 Claims, 29 Drawing Sheets

ICE MAKING MACHINE

BACKGROUND OF THE INVENTION

1. Field of the Invention

The present invention relates to an ice making machine and, in particular, to an improved ice making machine in which the freezing capacity of a freezing circuit is adjusted by detecting the ice making capacity of the ice making machine, thereby controlling the ice making capacity.

2. Description of the Related Art

Generally speaking, in an auger type ice making machine, its ice making mechanism comprises a drive motor (geared motor), a housing, a freezing casing, an auger (screw), etc., and ice making water supplied from a water supply tank to a cylinder contained in the freezing casing is stored while maintaining a fixed water level, ice being made continuously during operation of the ice making mechanism. Refrigerant flows through an evaporator, and ice gradually grows on the inner wall surface of the ice making cylinder. This ice is scraped off by a screw rotated by the geared motor, conveyed upwards, and cut into small pieces by a cutter (hereinafter also referred to as a stationary blade). The freezing circuit comprises an electric compressor, a condenser, a dehydrator, a thermal expansion valve, an evaporator, etc., and contains refrigerant therein. In the condenser, refrigerant at high temperature is cooled by a condenser cooling fan and is liquefied.

Ice made by an auger type ice making machine is often used in an ice bed or the like for cooling drinks, foods, etc. in a fast-food restaurant; the amount of ice used is maximum in the summer, when the atmospheric temperature is high. Naturally, the ice making machine is designed such that its cooling capacity satisfies demands corresponding to high temperature.

Thus, the refrigerant gas is cooled efficiently or inefficiently according to changes in the atmospheric temperature and water temperature, thereby indicating the capacity of the machine.

However, as can be seen from the capacity chart of FIG. 31, in a conventional apparatus, the ice making capacity gradually deteriorates as the temperature and water temperature increase; depending upon the condition for the design spec capacity, the spec capacity varies under different conditions.

Since the design spec capacity is adjusted to high temperature, the freezing capacity becomes too large under low temperature environment, with the result that the cylinder is clogged with ice, with an excessive load being applied to the screw. This leads to problems, such as generation of unusual noise and breakage of the drive motor.

In view of this, Japanese Patent Laid Open No. 06-207768, Japanese Patent Laid Open No. 08-178487, Japanese Utility Model Laid Open No. 59-47172, and Japanese Patent Laid Open No. 57-142466 disclose a technique according to which the temperatures of the condenser and the evaporator are measured, and the RPM (revolutions per minute) of the drive motor is varied according to the measurements to thereby avoid the above problem. Apart from this, Japanese Patent Laid Open Nos. 61-125566 and 09-303914 disclose a technique according to which the ice making capacity is controlled according to variation in a detected current value; the detection of a current value, however, is subject to the influence of fluctuations in voltage. Further, the difference between normal and abnormal current values is rather small, so that it is extremely difficult to recognize.

Therefore, although both the above conventional techniques help to avoid breakage and failure of the drive motor, they have a problem in that an excessive amount of ice is likely to be made, resulting in large consumption of electric power and water and a rather short service life.

SUMMARY OF THE INVENTION

This invention has been made with a view toward solving the above problems in the prior art. It is an object of this invention to provide an ice making machine whose ice making capacity is optimally controlled according to the environment in which ice making operation is performed, whereby an excess in ice making capacity is eliminated, thereby achieving a reduction in the consumption of electric power and water and preventing failure and breakage of the ice making mechanism portion so as to achieve an increase in service life.

In accordance with this invention, there is provided an ice making machine comprising: an ice making portion; a water supply tank for supplying ice making water to the ice making portion; a freezing circuit including an evaporator for cooling ice making water supplied to the ice making portion to make ice; ice making capacity detecting means for detecting fluctuation in ice making capacity; and a control circuit which adjusts the freezing capacity of the freezing circuit whenever fluctuation in ice making capacity is detected by the ice making capacity detecting means.

The ice making capacity detecting means can be constructed such that it detects fluctuation in ice making capacity by comparing one of the following factors with the corresponding reference values:

(1) an ice making water consumption time;
(2) a temperature of the condenser of the freezing circuit;
(3) a compression ratio of the compressor of the freezing circuit;
(4) an ice making water consumption time and a temperature of the condenser of the freezing circuit;
(5) an ice making water consumption time and a compression ratio of the compressor of the freezing circuit;
(6) an ice making water consumption time, a temperature of the condenser of the freezing circuit and a compression ratio of the compressor of the freezing circuit;
(7) an evaporation temperature of the refrigerant of the evaporator of the freezing circuit;
(8) a flow rate of the ice making water supplied to the ice making portion; and
(9) change in the level of the ice making water in the water supply tank.

In a case that one of the temperature of the condenser, the compression ratio of the compressor and the evaporation temperature of the refrigerant of the evaporator is compared with the corresponding reference value, the reference value may be adjusted based on the atmospheric temperature or the temperature of the ice making water.

It is desirable for the control circuit to be constructed so as to adjust the RPM of the fan motor of the condenser of the freezing circuit or the RPM of the compressor of the freezing circuit.

DESCRIPTION OF THE PREFERRED EMBODIMENTS

Embodiment 1

Figure 1:
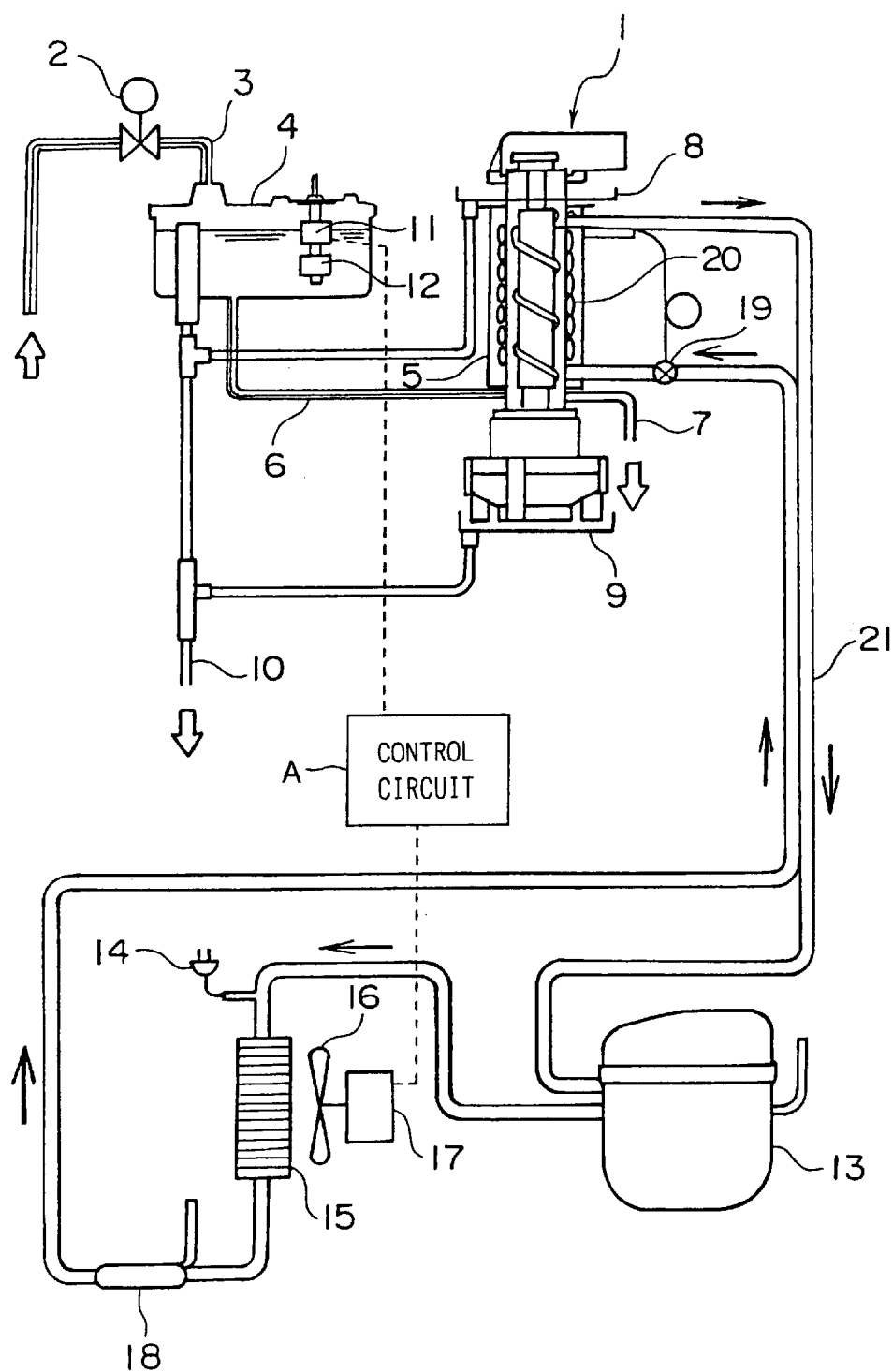
FIG. 1 is a schematic diagram showing the general construction of an auger type ice making machine according to Embodiment 1 of this invention.
Figure 2:
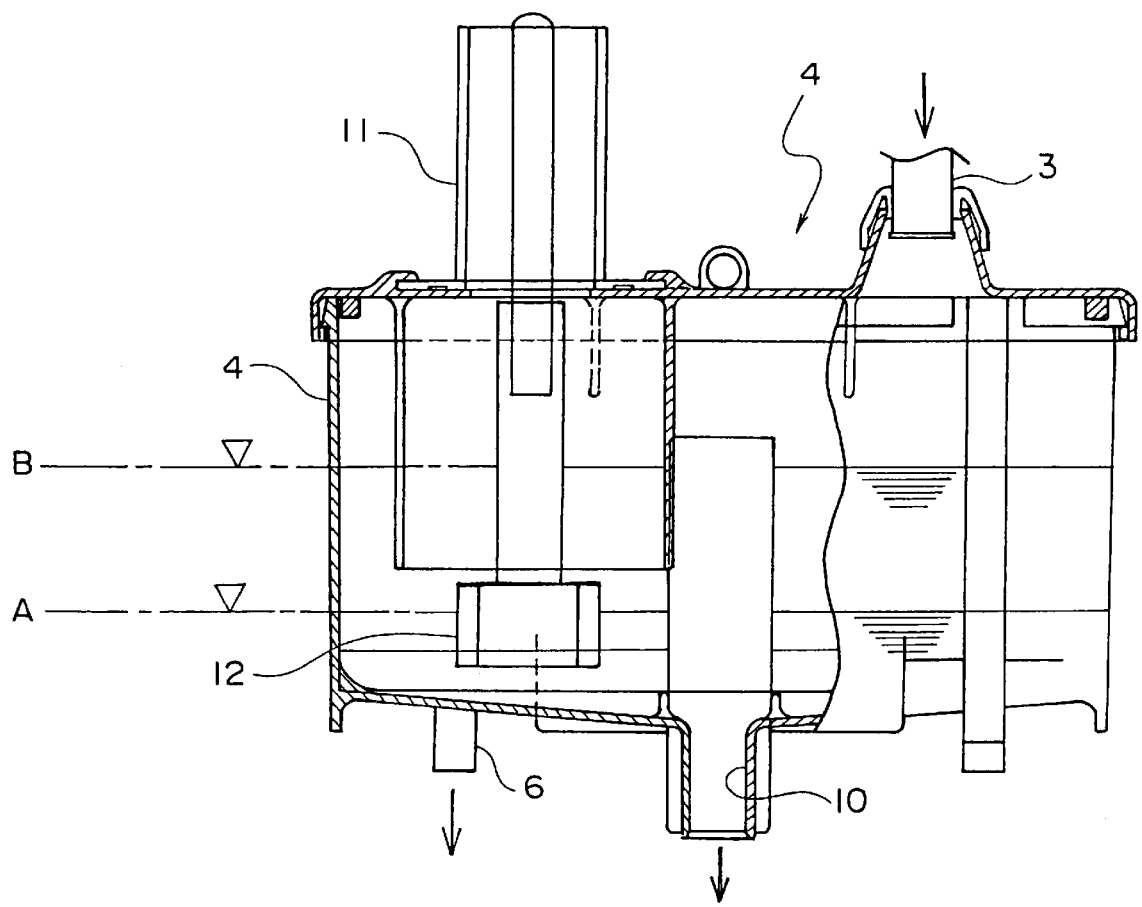
FIG. 2 is a longitudinal sectional view of a water supply tank.
Figure 3:
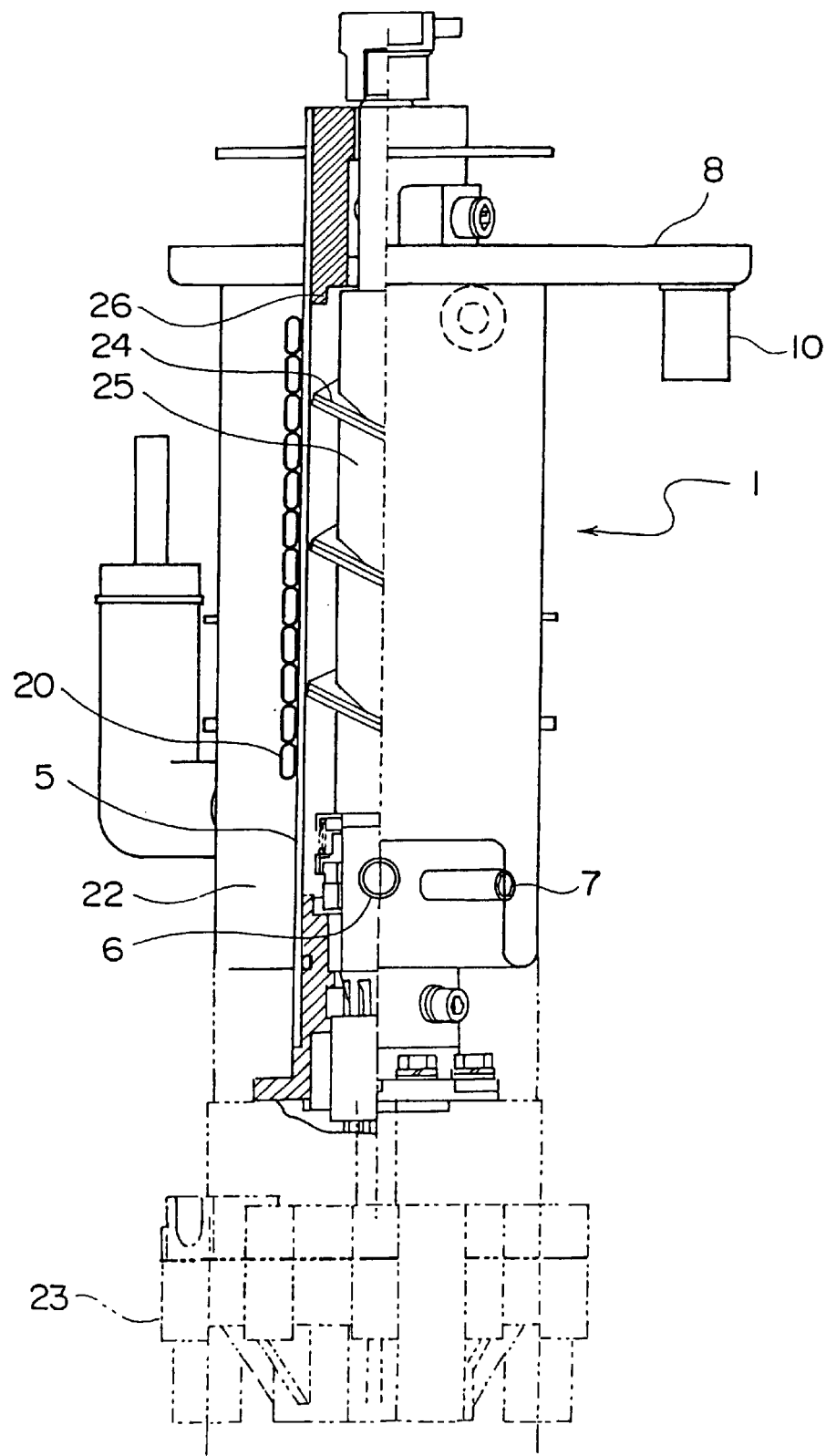
FIG. 3 is a side view, partially in longitudinal section, of the ice making mechanism portion of an auger type ice making machine.
Figure 4:
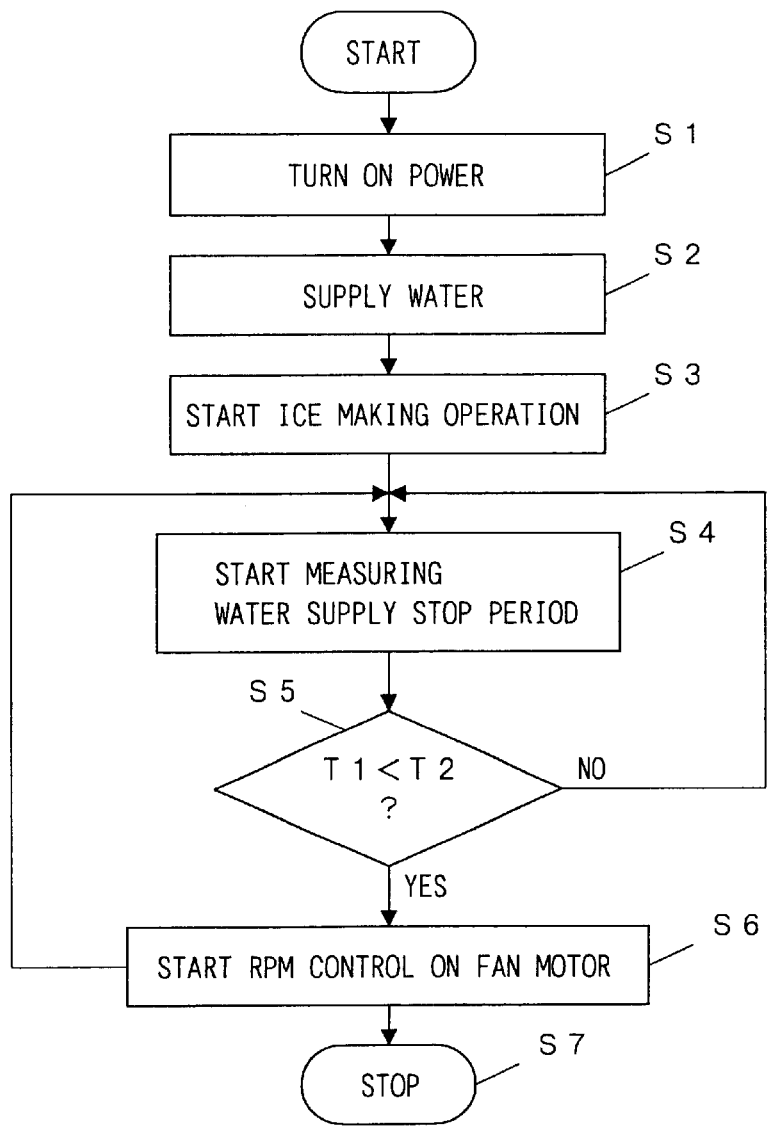
FIG. 4 is a flowchart illustrating the operation of Embodiment 1.
Figure 5:
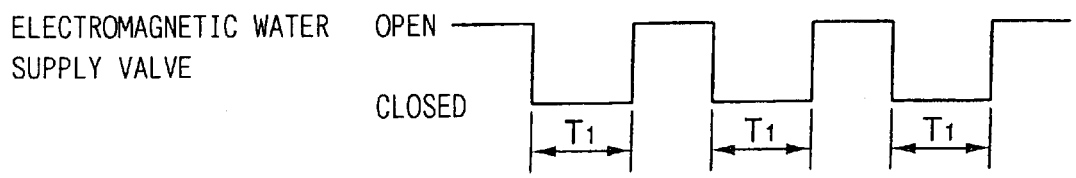
FIG. 5 is a timing chart illustrating water supply stop timing for an electromagnetic water supply valve.

Embodiment 1 of this invention will now be described with reference to FIGS. 1 through 5. FIG. 1 is a diagram showing the water route and the freezing circuit of an auger type ice making machine to which this embodiment is applied; FIG. 2 is a longitudinal sectional view of a water supply tank; FIG. 3 is a side view, partially in longitudinal section, of the ice making mechanism portion of the auger-type ice making machine; FIG. 4 is a flowchart illustrating the operation of Embodiment 1; and FIG. 5 is a timing chart illustrating water supply stop timing for an electromagnetic water supply valve.

Referring to FIGS. 1 and 2, the water route and the freezing circuit of an auger type ice making machine to which Embodiment 1 is applied will be described. The water route of the auger type ice making machine 1 is formed by an electromagnetic water supply valve 2, a water supply pipe 3, a water supply tank 4, a supply pipe 6 for supplying ice making water to a cylinder 5, a drain pipe 7 for draining the water in the cylinder 5, and an overflow drain pipe 10 for discharging water overflowing from the water supply tank 4 and upper and lower drain pans 8 and 9. In the water supply tank 4, there is accommodated a water level detecting switch 11 for detecting the level of the ice making water; when its float 12 is at level A, the water level detecting switch 11 is turned ON, and the electromagnetic water supply valve 2 is opened to supply ice making water to the water supply tank 4. When the float 12 is raised to reach level B, the water level detecting switch 11 is turned OFF, and with this, the electromagnetic water supply valve 2 is closed to stop the water supply to the water supply tank 4. Thus, until the water level detecting switch 11 is turned ON next, that is, until the electromagnetic water supply valve 2 starts the next opening operation, all the ice making water in the water supply tank 4 is turned into ice by the auger type ice making machine 1, which makes ice continuously.

The freezing circuit of the auger type ice making machine 1 is formed by a compressor 13, a pressure switch 14, a condenser 15, a fan motor 17 for driving a fan 16 for cooling the condenser 15, a dehydrator 18, a thermal expansion valve 19, an evaporator 20, and a freezing passage 21; refrigerant flows through the refrigerant passage 21 in the direction of the arrow in FIG. 1. The fan motor 17 consists, for example, of a DC motor, whose RPM is varied by a control circuit A as appropriate.

The water level detecting switch 11 constitutes the ice making capacity detecting means of this invention.

As shown in FIG. 3, the ice making mechanism portion of the auger type ice making machine 1 comprises a vertically arranged cylinder 5, an evaporator 20 wound around the outer peripheral surface of the cylinder 5 so as to be in face contact therewith, a screw 25 (hereinafter also referred to as "auger") having a spiral blade 24 to be rotated in the cylinder 5 by a driving motor 23, a cutter 26 (hereinafter referred to as "stationary blade"), and a freezing casing 22 covering the entire cylinder 5 so as to insulate the evaporator 20 from the atmospheric air. The ice formed on the inner peripheral surface of the cylinder 22 is scraped off upwards by the spiral blade 24 and cut by the cutter 26.

Next, the ice making capacity detecting means featuring Embodiment 1 will be described with reference to FIGS. 4 and 5. In this embodiment, the RPM of the fan motor 17 for cooling the condenser 15 is reduced according to variation in the ON and OFF times of the water level detecting switch 11 mounted in the water supply tank 4 to lower the condensing capacity on purpose, thereby restraining excessive ice making. When the water level detecting switch 11 is turned ON, the electromagnetic water supply valve 2 is opened, and water supply to the water supply tank 4 is started. When a predetermined water supply amount is reached, the water level detecting switch 11 is turned OFF, whereby the electromagnetic water supply valve 2 is closed, and the water supply is terminated. During this time, the auger type ice making machine 1 continues the continuous ice making operation. When the water level in the water supply tank 4 is reduced to a predetermined value, the water level detecting switch 11 detects it and is turned ON, and the electromagnetic water supply valve 2 is opened again to start water supply. By repeating this series of operations, a predetermined amount of ice making water is supplied to the water supply tank 4; when the ice making water is used up, water supply is conducted again, thus performing continuous ice making. Thus, the ice making capacity detecting means is based on the following idea: the auger type ice making machine 1 is a machine for continuous ice making, and the water in the water supply tank 4 is all turned into ice, so that, by fixing the capacity of the water supply tank, the length of time from the instant the water level detecting switch 11 is turned OFF to the instant it is turned ON again, that is, the ice making water consumption time, is measured, making it possible to correctly ascertain any fluctuation in ice making capacity.

Thus, the length of time from turning OFF of the water level detecting switch 11 to turning ON of the same, that is, the water supply stop period T1 between closing of the electromagnetic water supply valve 2 (completion of water supply) and re-opening of the same (water supply start), is measured so as to indicate ice making water consumption time (FIG. 5). On the other hand, an arbitrary reference time T2 is determined so as to be in conformity with temperature conditions where not much ice is required as in the winter. The ice making capacity detecting means compares these times T1 and T2 with each other and makes a judgment based upon the comparison result.

When the water-supply-stop time T1 is not shorter than the reference time T2, the control circuit A does not change the RPM of the fan motor 17. When the water-supply-stop time T1 is shorter than the reference time T2, it determines that there is an excess in ice making capacity, and lowers the RPM of the fan motor 17 to eliminate this excess.

The operation of Embodiment 1 will be described with reference to FIG. 4. When the power is turned on in step S1, the auger type ice making machine 1 is made ready for operation. In step S2, the electromagnetic water supply valve 2 is opened, and ice making water is supplied to the water supply tank 4, and, in step S3, the auger type ice making machine 1 starts ice making operation. In step S4, the water level detecting switch 11 starts measurement. In step S5, the water-supply-stop time T1 and the reference time T2 are compared with each other; when the water-supply-stop time T1 is not shorter than the reference time T2, the procedure returns to step S4. When the water-supply-stop time T1 is shorter than the reference time T2, the control circuit A starts in step S6 RPM control on the cooling fan motor 17 for the condenser 15, and effects control so as to reduce the RPM of the fan motor 17. This routine is repeatedly executed while the auger type ice making machine 1 is in operation, until the power is turned off in step S7. This makes it possible to correctly ascertain any fluctuation in ice making capacity. For example, in winter, when not much ice is required, the condensing capacity of the condenser 15 is lowered on purpose, whereby it is possible to smoothly avoid excessive ice making and to prevent an excess load from being applied to the ice making mechanism portion.

While in Embodiment 1, RPM control is performed on the fan motor 17 only when the water-supply-stop time T1 is shorter than the reference time T2, it is also possible to form the system such that when the water-supply-stop time T1 is longer than the reference time T2, it is determined that the amount of ice made by the auger type ice making machine has not reached a desired level, and the RPM of the fan motor 17 is increased to achieve an improvement in ice making capacity.

Embodiment 2

Figure 6:
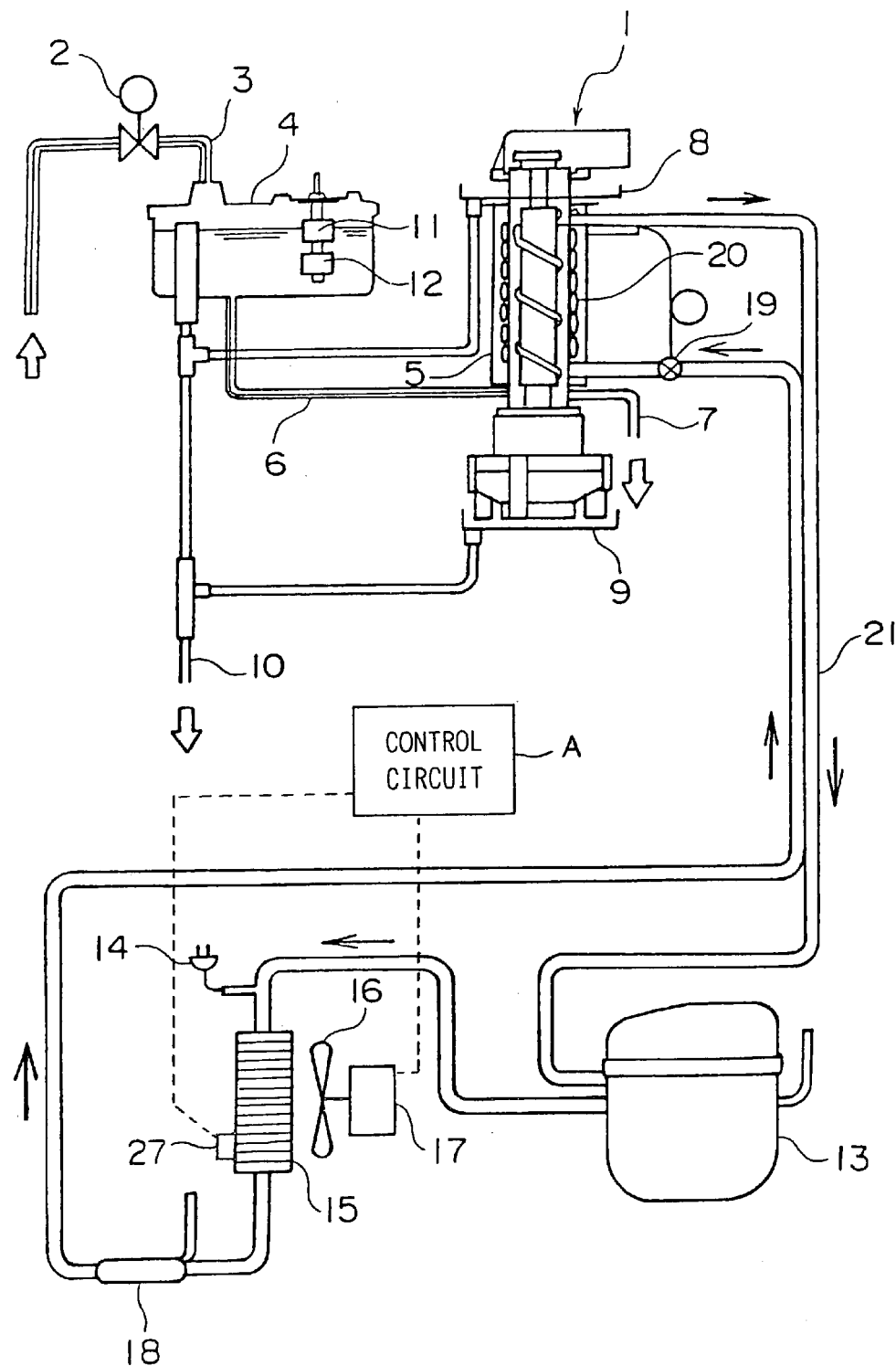
FIG. 6 is a schematic diagram showing the general construction of an auger type ice making machine according to Embodiment 2.

As shown in FIG. 6, in Embodiment 2, the ice making machine of Embodiment 1 is equipped with a temperature sensor 27 for detecting the temperature of the condenser 15, and the ice making capacity detecting means is formed by this temperature sensor 27. Otherwise, this embodiment is of the same construction as Embodiment 1, so that the following description will be focused on where it differs from Embodiment 1. The measurement temperature CT1 of the condenser 15 measured by the temperature sensor 27 is compared with an arbitrary reference temperature CT2. And, when the measurement temperature CT1 measured by the temperature sensor 27 is lower than the reference temperature CT2, the control circuit A performs control so as to reduce the RPM of the fan motor 17, whereby the condensing capacity is lowered on purpose to restrain excessive ice making.

Figure 7:
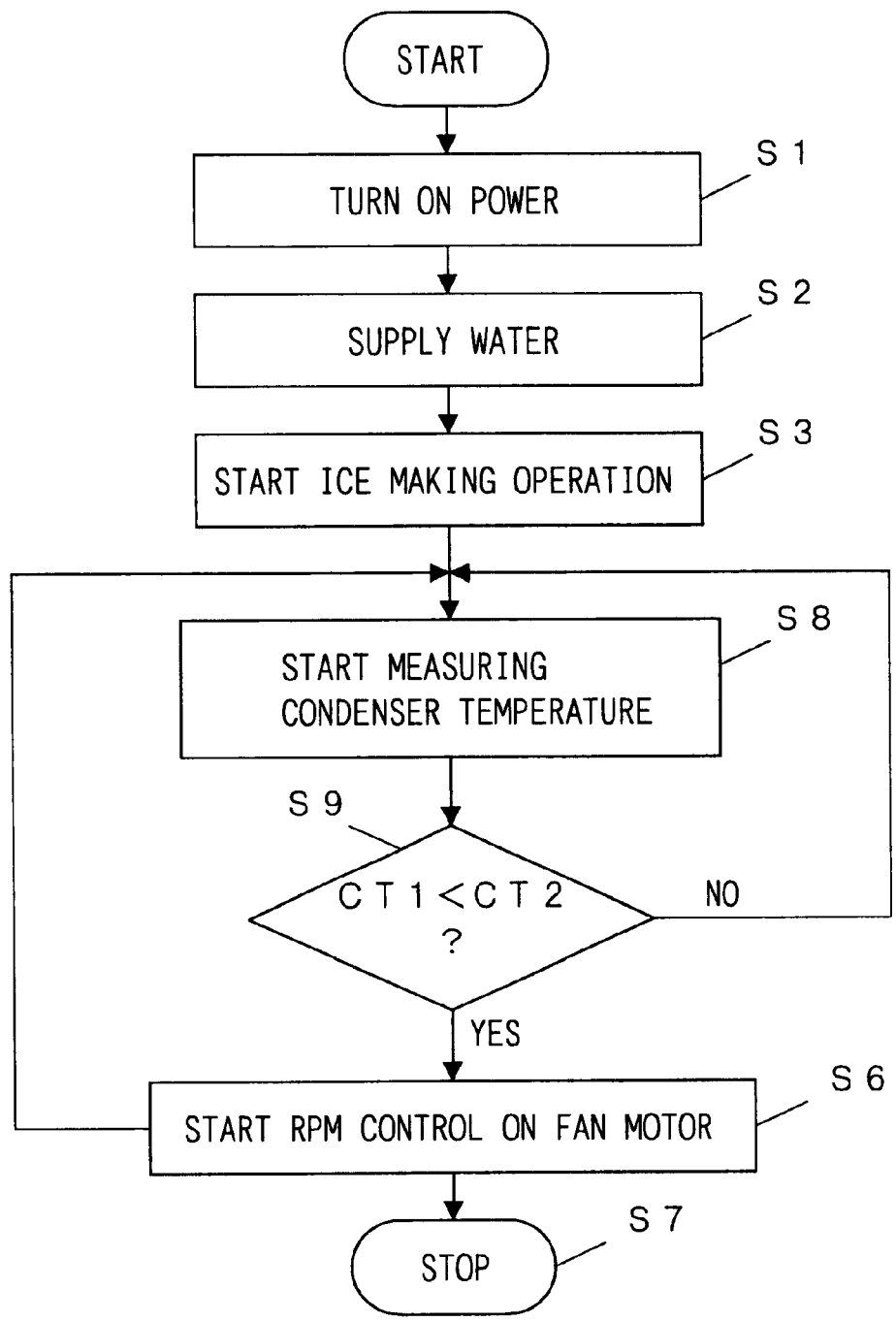
FIG. 7 is a flowchart illustrating the operation of Embodiment 2.

Thus, as shown in the flowchart of FIG. 7 (where the steps that are the same as those of Embodiment 1 are indicated by the same reference numerals), in Embodiment 2, when ice making operation is started in step S3, the temperature sensor 27 starts measurement of the temperature of the condenser 15 in step S8, and the measurement temperature CT1 and the reference temperature CT2 are compared with each other in step S9. And, when it is determined that the measurement temperature CT1 is lower than the reference temperature CT2, the control circuit A determines that the auger type ice making machine 1 is in an excessive-ice-making state, and the procedure advances to step S6, where the RPM control is started on the fan motor 17 for cooling the condenser 15 so as to reduce the RPM of the fan motor 17.

Further, by measuring the temperature of the central portion of the condenser 15 by the temperature sensor 27, it is possible to minimize the number of positions of measurement and to make a more accurate judgment on the condition of the freezing circuit.

Embodiment 3

Figure 8:
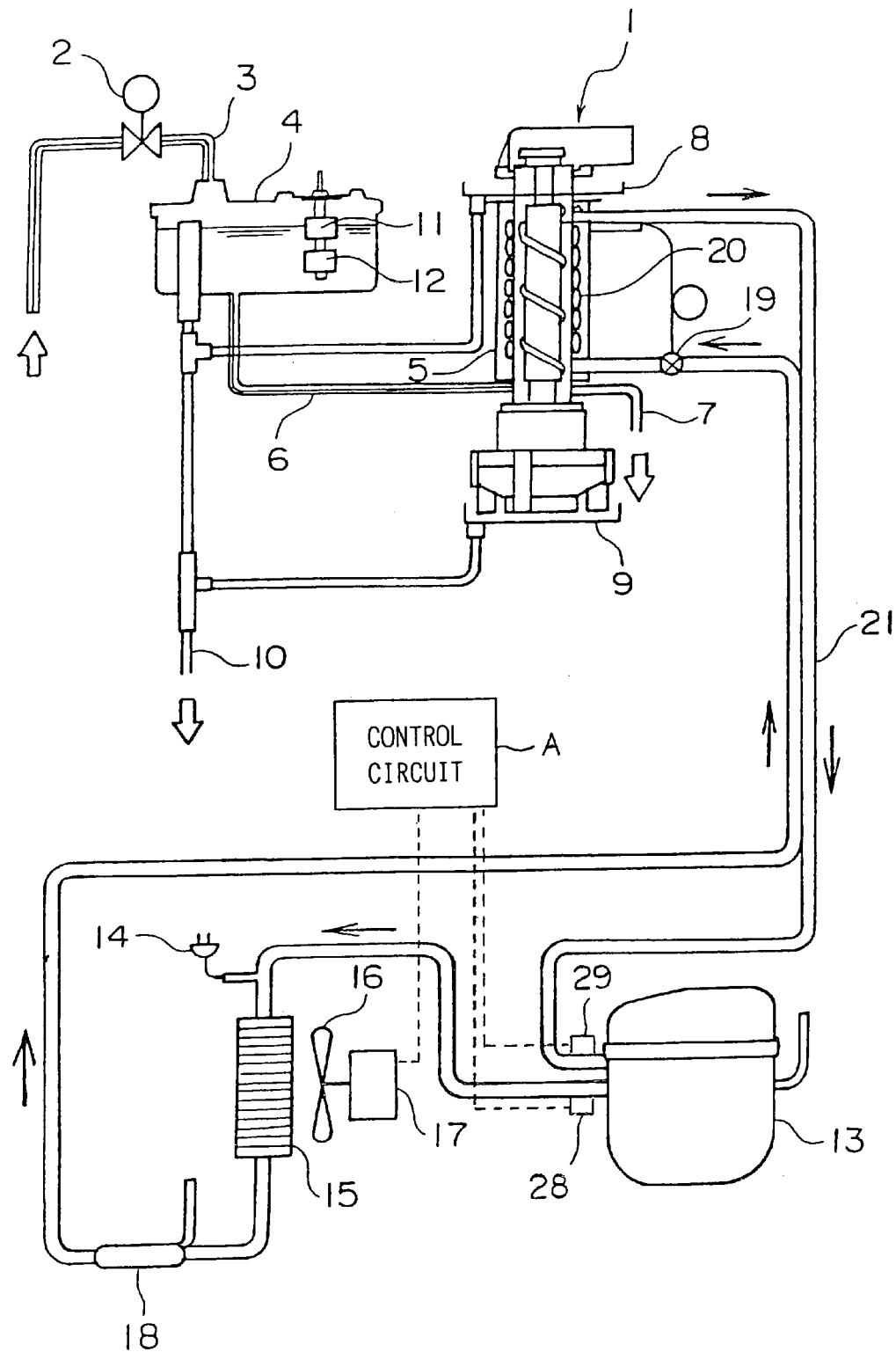
FIG. 8 is a schematic diagram showing the general construction of an auger type ice making machine according to Embodiment 3.

As shown in FIG. 8, in Embodiment 3, the ice making machine of Embodiment 1 is equipped with pressure sensors 28 and 29 for detecting the high-pressure-side pressure and the low-pressure-side pressure of the compressor 13, and the ice making capacity detecting means of this invention is formed by the pressure sensors 28 and 29. Since the other structures are the same as those of Embodiment 1, only the points that differ therefrom are explained below. From the high-pressure-side pressure and the low-pressure-side pressure measured by the pressure sensors 28 and 29, a compression ratio A1 is calculated, and this compression ratio A1 is compared with an arbitrary reference value A2. When the compression ratio A1 is lower than the reference value A2, the control circuit A performs control so as to reduce the RPM of the fan motor 17, whereby the condensing capacity is lowered on purpose to thereby restrain excessive ice making.

Figure 9:
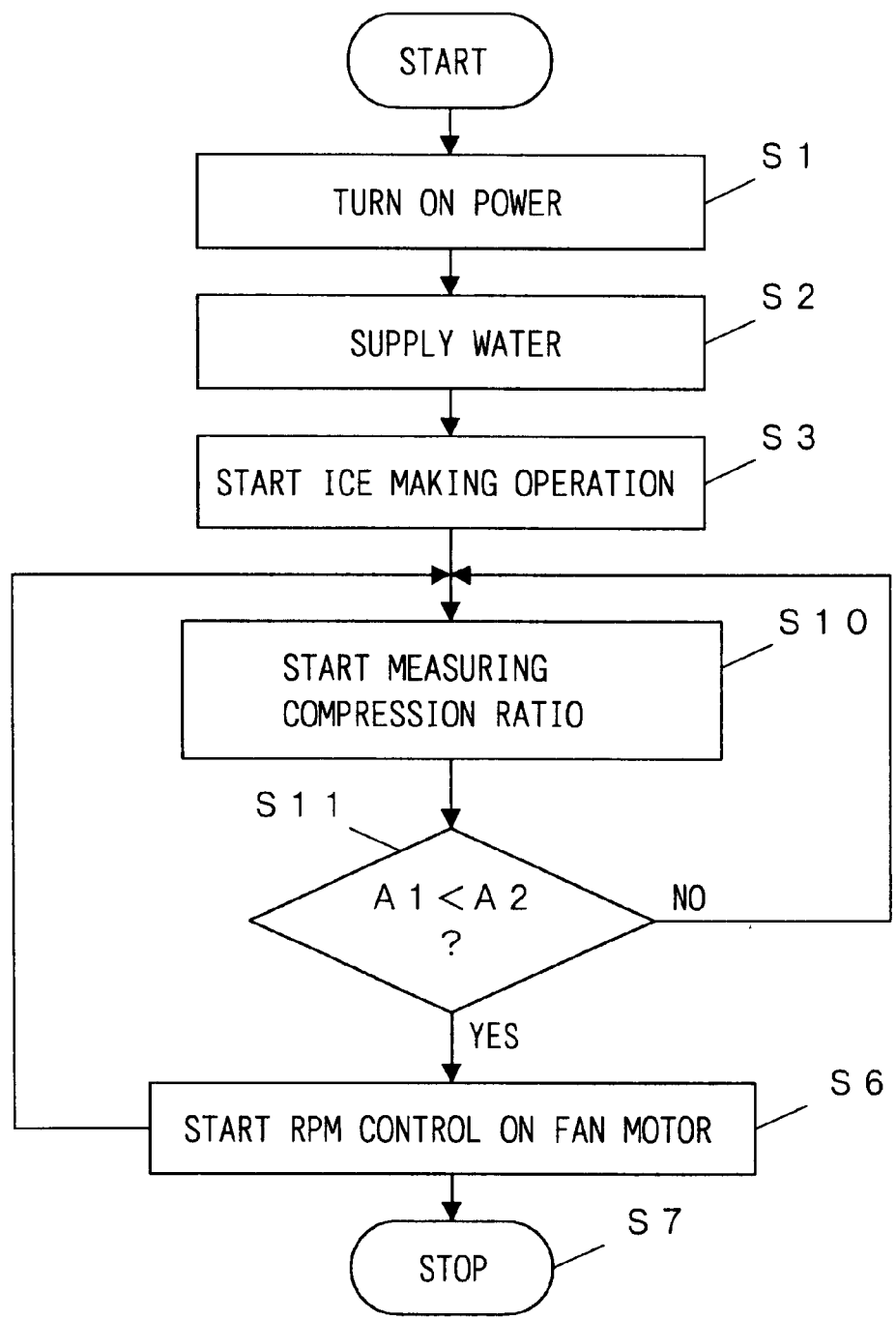
FIG. 9 is a flowchart illustrating the operation of Embodiment 3.

Thus, as shown in the flowchart of FIG. 9, when ice making operation is started in step S3, the pressure sensors start measurement of the compression ratio A1 of the compressor 13 in step S10, and the compression ratio A1 and the reference value A2 are compared with each other in step S11. Then, when it is determined that the compression ratio A1 is lower than the reference value A2, the control circuit A determines that the auger type ice making machine 1 is in an excessive-ice-making state, and the procedure advances to step S6, where the RPM control is started on the fan motor 17 for the condenser 15 so as to reduce the RPM of the fan motor 17.

Embodiment 4

Figure 10:
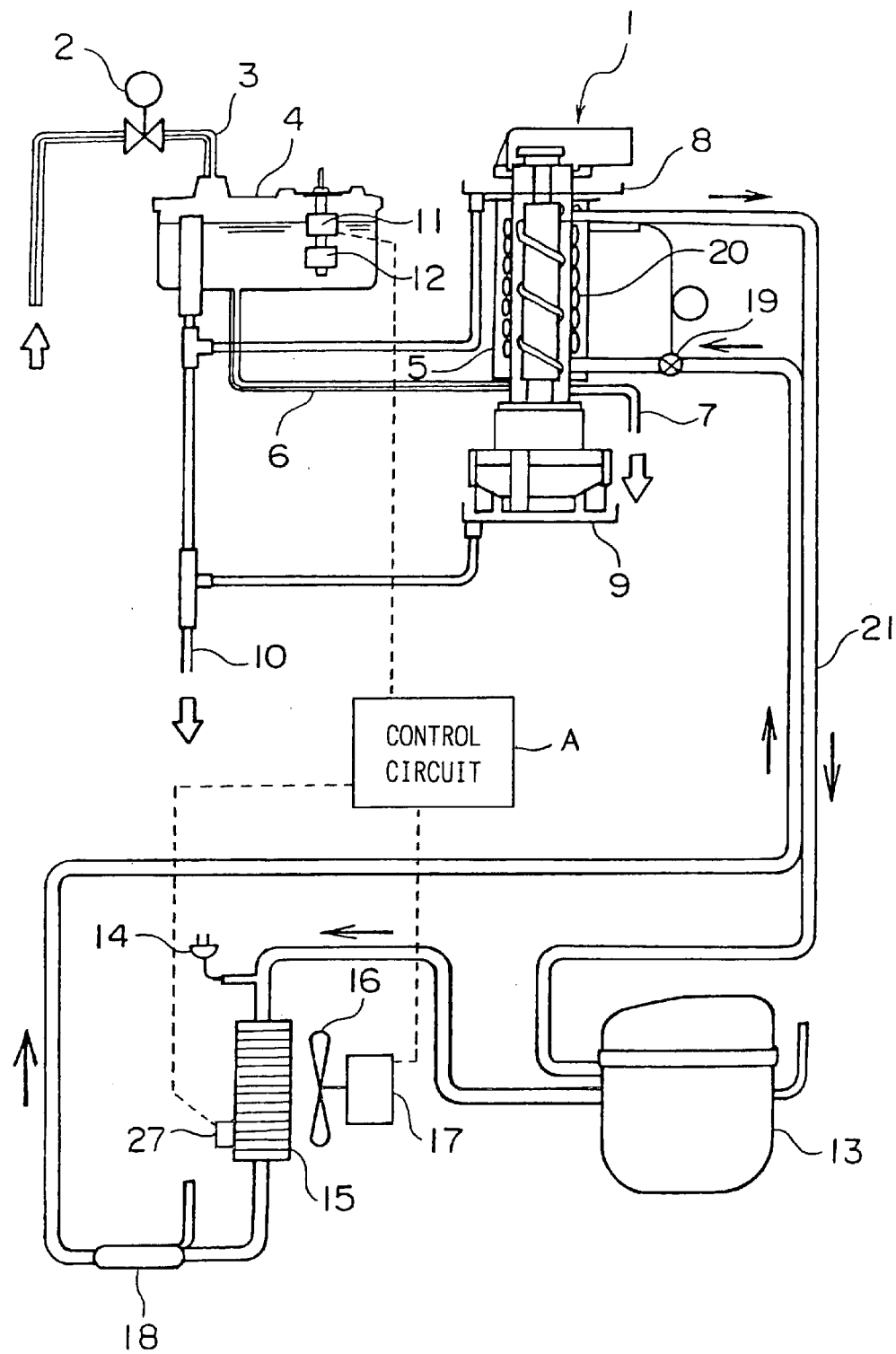
FIG. 10 is a schematic diagram showing the general construction of an auger type ice making machine according to Embodiment 4.

As shown in FIG. 10, in Embodiment 4, the ice making capacity detecting means is formed by the temperature sensor 27 and the water level detecting switch 11. When the water-supply-stop time T1 measured by the water level detecting switch 11 is lower than the reference time T2 while the measurement temperature CT1 measured by the temperature sensor 27 is lower than the reference temperature CT2, the control circuit A performs control so as to reduce the RPM of the fan motor 17, whereby the condensing capacity is lowered on purpose to restrain excessive ice making.

Figure 11:
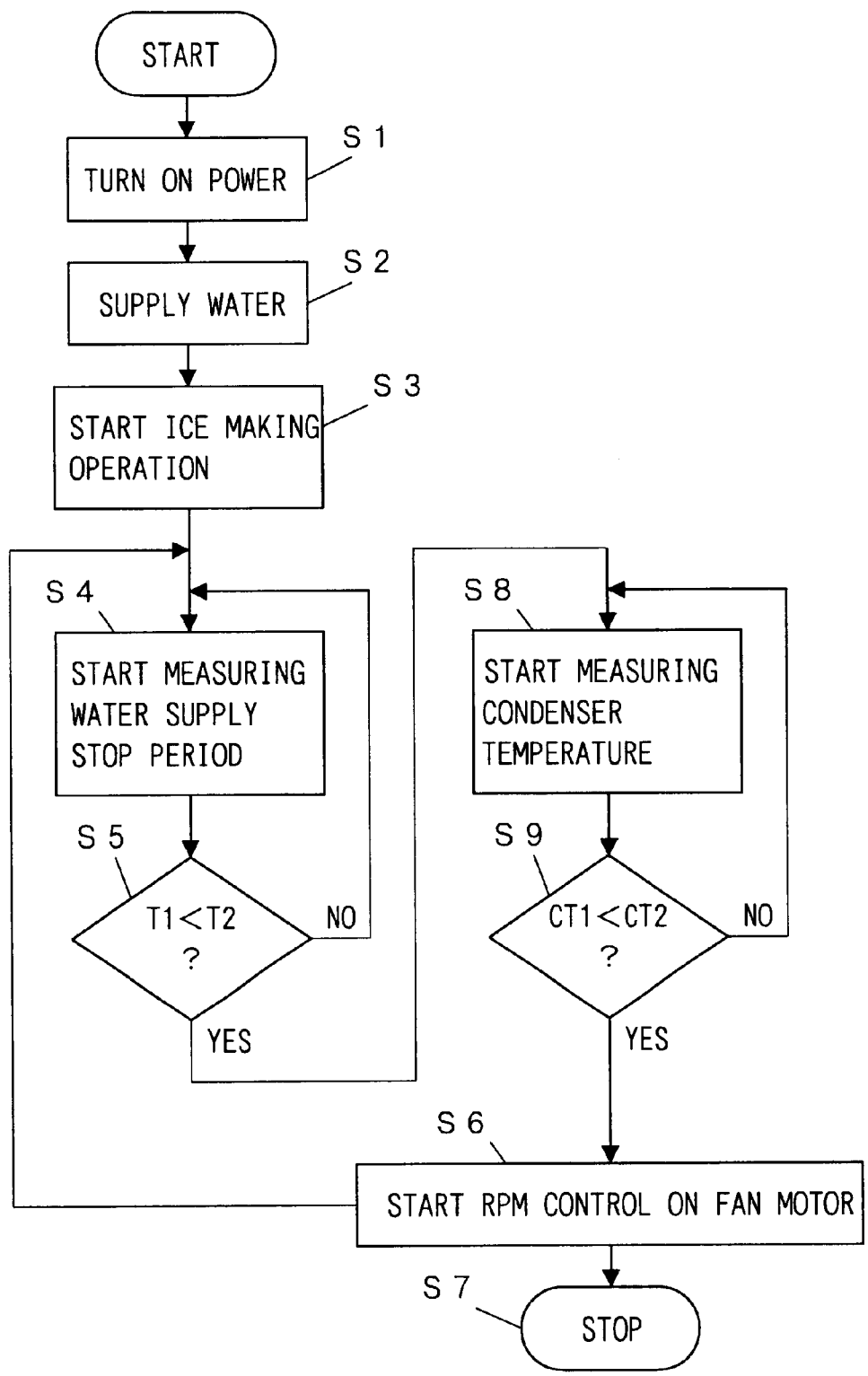
FIG. 11 is a flowchart illustrating the operation of Embodiment 4.

Thus, as shown in the flowchart of FIG. 11, in Embodiment 4, when ice making operation is started in step S3, the water level detecting switch 11 starts measurement in step S4, and then the water-supply-stop time T1 and the reference time T2 are compared with each other in step S5. When it is determined that the water-supply-stop time T1 is lower than the reference time T2, the temperature sensor 27 starts measurement of the temperature of the condenser 15 in step S8, and the measurement temperature CT1 and the reference temperature CT2 are compared with each other in step S9. And, when it is determined in step S9 that the measurement temperature CT1 is lower than the reference temperature CT2, the control circuit A determines that the auger type ice making machine 1 is in an excessive-ice-making state, and the procedure advances to step S6, where the RPM control is started on the fan motor 17 for cooling the condenser 15 so as to reduce the RPM of the fan motor 17.

In this way, ice making capacity is judged based on the time between turning OFF and turning ON of the water level detecting switch 11, that is, the ice making water consumption time and on the temperature of the condenser 15, and the RPM of the fan motor 17 for the condenser 15 can be controlled, so that if there is any abnormality in the water circuit, such as water leakage or malfunction of the float switch 11, there is little possibility of erroneous judgment.

Embodiment 5

Figure 12:
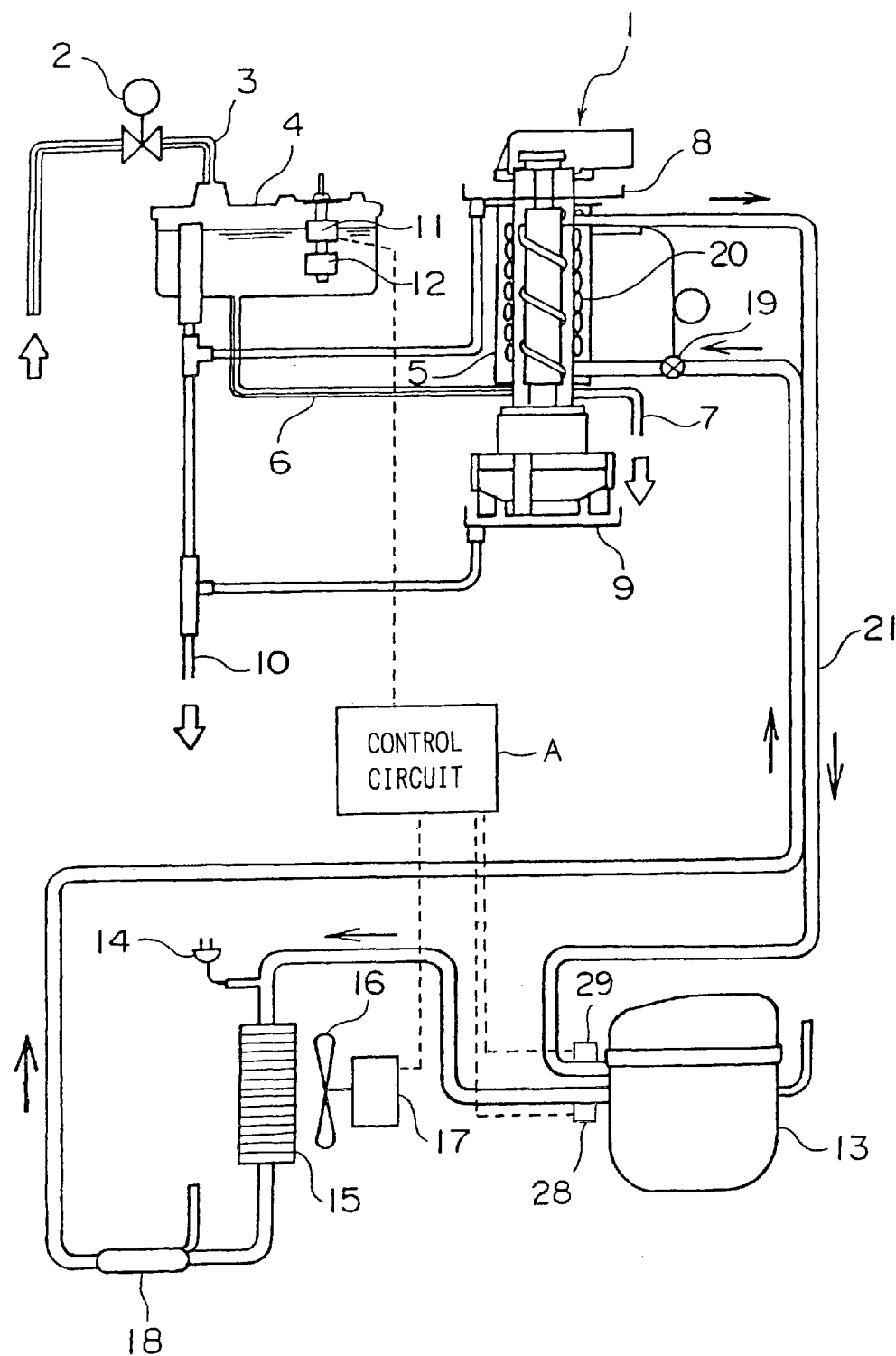
FIG. 12 is a schematic diagram showing the general construction of an auger type ice making machine according to Embodiment 5.

As shown in FIG. 12, in Embodiment 5, the ice making capacity detecting means of this invention is formed by the pressure sensors 28 and 29, and the water level detecting switch 11. When the water-supply-stop time T1 measured by the water level detecting switch 11 is lower than the reference time T2 while the compression ratio A1 is lower than the reference value A2, the control circuit A performs control so as to reduce the RPM of the fan motor 17, whereby the condensing capacity is lowered on purpose to thereby restrain excessive ice making.

Figure 13:
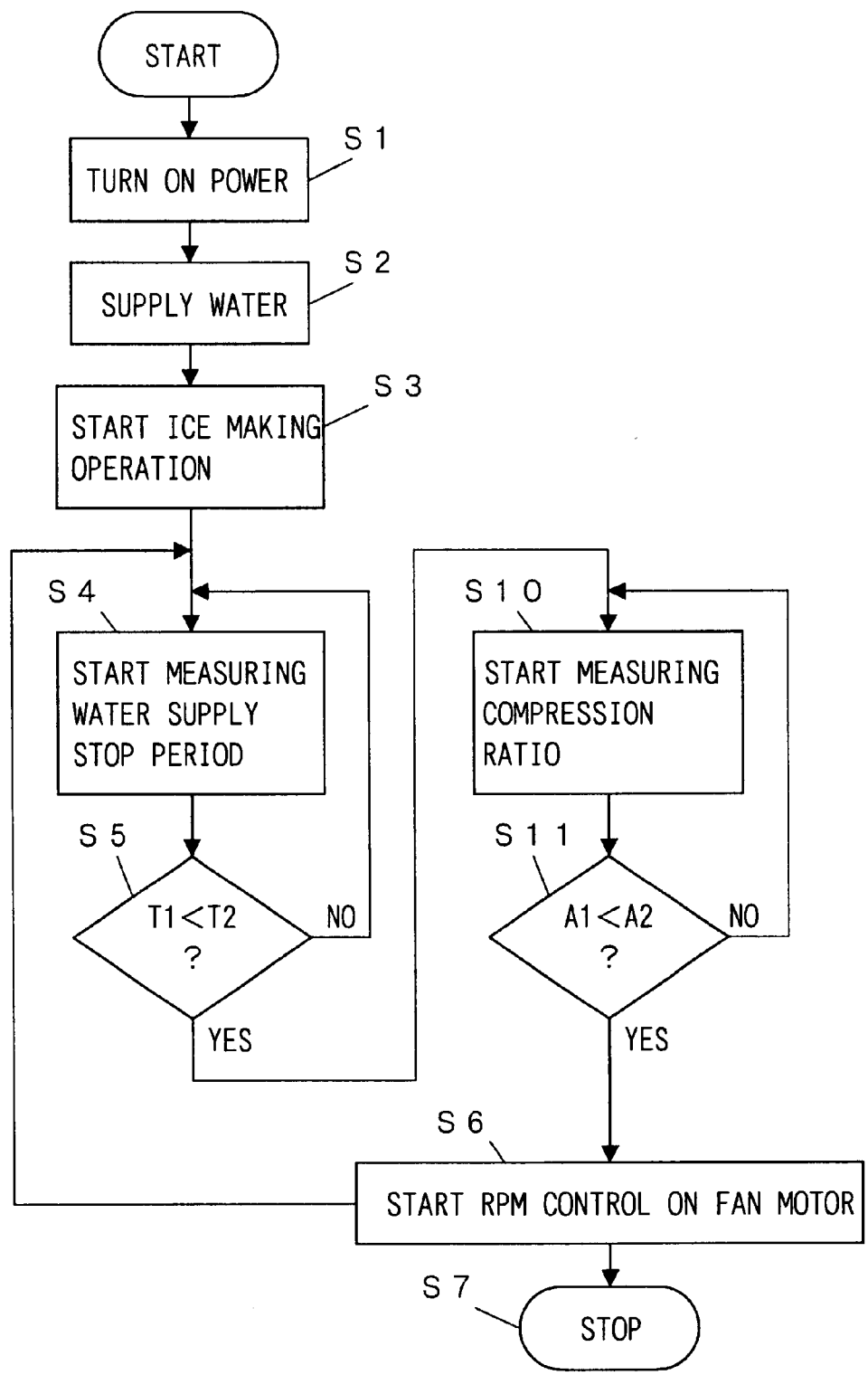
FIG. 13 is a flowchart illustrating the operation of Embodiment 5.

Thus, as shown in the flowchart of FIG. 13, when ice making operation is started in step S3, the water level detecting switch 11 starts measurement in step S4, and the water-supply-stop time T1 and the reference time T2 are compared with each other in step S5. When it is determined that the water-supply-stop time T1 is lower than the reference time T2, the pressure sensors start measurement of the compression ratio A1 of the compressor 13 in step S10, and then the compression ratio A1 and the reference value A2 are compared with each other in step S11. When it is determined that the compression ratio A1 is lower than the reference value A2, the control circuit A determines that the auger type ice making machine 1 is in an excessive-ice-making state, and the procedure advances to step S6, where the RPM control is started on the fan motor 17 for the condenser 15 so as to reduce the RPM of the fan motor 17.

In this way, the RPM of the fan motor 17 for the condenser 15 can be controlled based on the time between turning OFF and turning ON of the water level detecting switch 11, that is, the ice making water consumption time and on the compression ratio of the compressor 13, so that if there is any abnormality in the water circuit, such as water leakage or malfunction of the float switch 11, there is little possibility of erroneous judgment.

Embodiment 6

Figure 14:
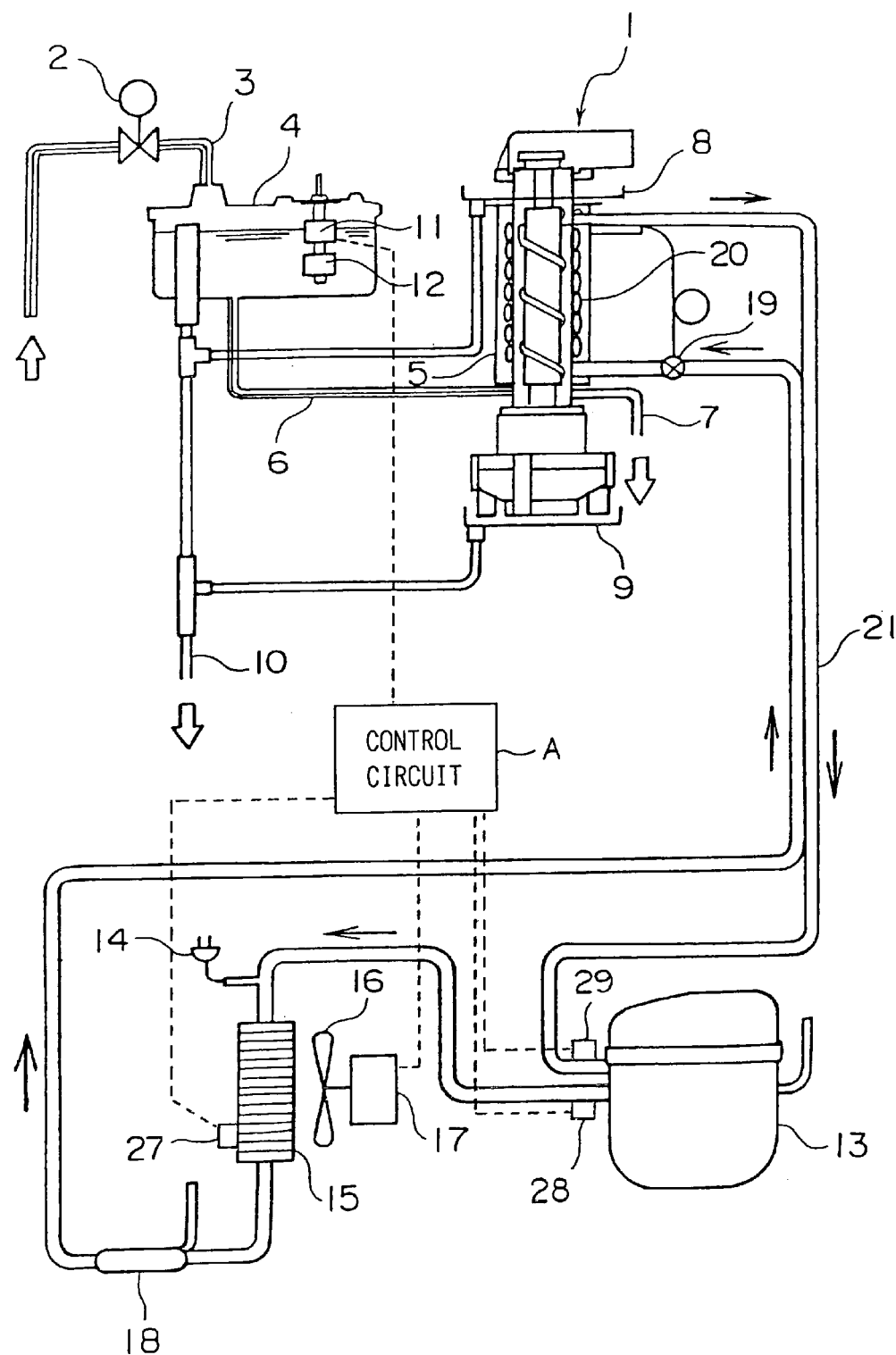
FIG. 14 is a schematic diagram showing the general construction of an auger type ice making machine according to Embodiment 6.

As shown in FIG. 14, in Embodiment 6, the ice making machine of Embodiment 2 is further equipped with pressure sensors 28 and 29 for detecting the high-pressure-side pressure and the low-pressure-side pressure of the compressor 13, and the ice making capacity detecting means of this invention is formed by the pressure sensors 28 and 29, the water level detecting switch 11, and the temperature sensor 27 for detecting the temperature of the condenser 15. When the water-supply-stop time T1 measured by the water level detecting switch 11 is lower than the reference time T2, and the measurement temperature CT1 of the condenser 15 is lower than the reference temperature CT2, and, further, the compression ratio A1 is lower than the reference value A2, the control circuit A performs control so as to reduce the RPM of the fan motor 17, whereby the condensing capacity is lowered on purpose to thereby restrain excessive ice making.

Figure 15:
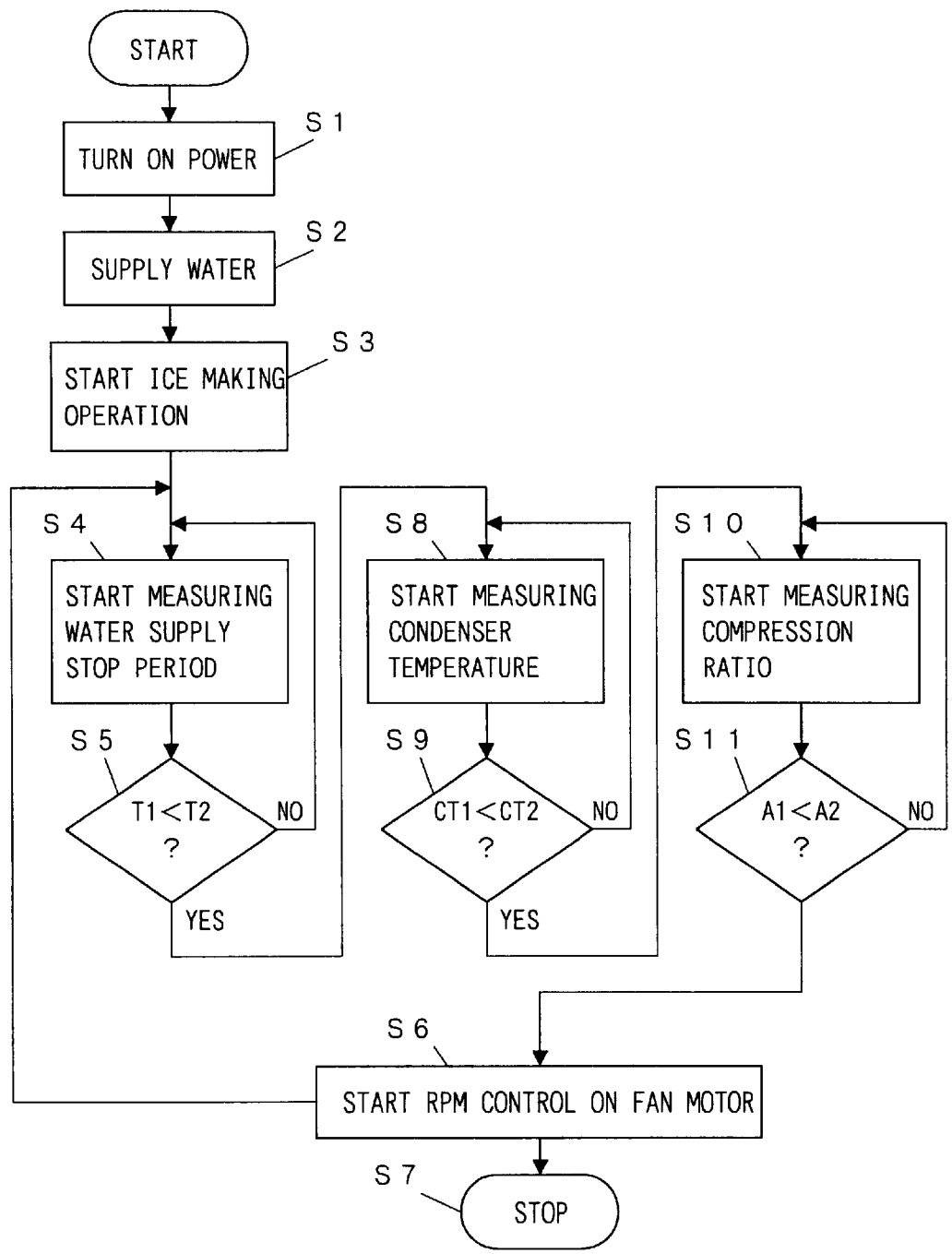
FIG. 15 is a flowchart illustrating the operation of Embodiment 6.

Thus, as shown in the flowchart of FIG. 15, when ice making operation is started in step S3, the water level detecting switch 11 starts measurement in step S4, and the water-supply-stop time T1 and the reference time T2 are compared with each other in step S5. When it is determined that the water-supply-stop time T1 is lower than the reference time T2, the temperature sensor 27 starts measurement of the temperature of the condenser 15 in step S8, and then the measurement temperature CT1 and the reference temperature CT2 are compared with each other in step S9. And, when it is determined that the measurement temperature CT1 is lower than the reference temperature CT2, the pressure sensors 28 and 29 start measurement of the compression ratio A1 of the compressor 13 in step S10, and the compression ratio A1 and the reference value A2 are compared with each other in step S11. When it is determined that the compression ratio A1 is lower than the reference value A2, the control circuit A determines that the auger type ice making machine 1 is in an excessive-ice-making state, and the procedure advances to step S6, where the RPM control is started on the fan motor 17 for cooling the condenser 15 so as to reduce the RPM of the fan motor 17.

In this way, the RPM of the fan motor 17 for the condenser 15 can be controlled based on the time between turning OFF and turning ON of the water level detecting switch 11, that is, ice making water consumption time, the temperature of the condenser 15, and the compression ratio of the compressor 13, so that if there is any abnormality in the water circuit, such as water leakage or malfunction of the float switch 11, there is little possibility of erroneous judgment.

Embodiment 7

Figure 16:
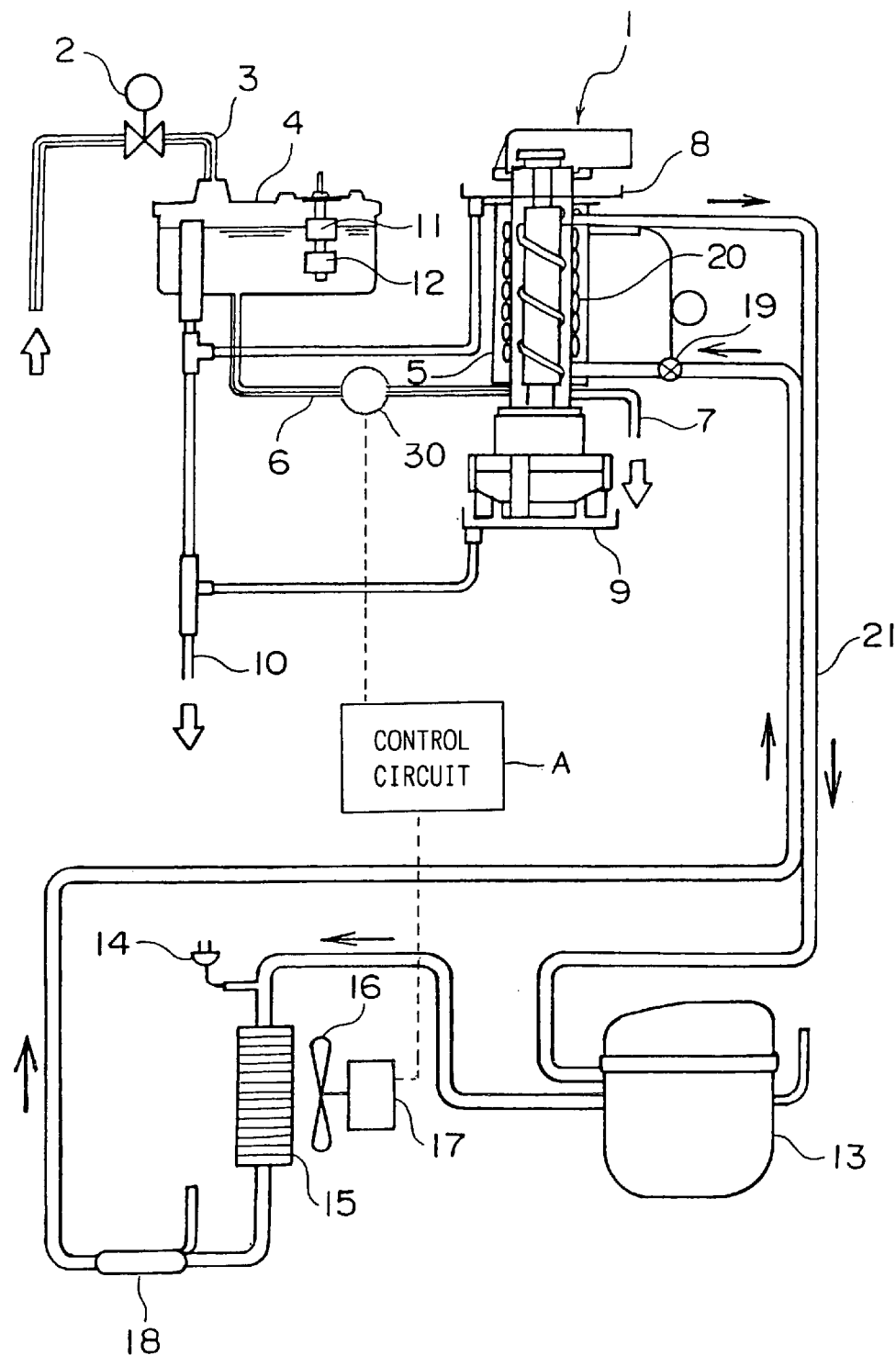
FIG. 16 is a schematic diagram showing the general construction of an auger type ice making machine according to Embodiment 7.

As shown in FIG. 16, in Embodiment 7, the supply pipe 6 of the ice making machine of Embodiment 1 is equipped with a flow meter 30, which constitutes the ice making capacity detecting means of this invention. Ice making water is supplied anew through the supply pipe 6 to the cylinder 5 in an amount corresponding to the amount of the water turned into ice by the cylinder 5 and discharged therefrom. Thus, by detecting the flow rate R1 of the ice making water supplied from the water supply tank 4 to the cylinder 5 by means of the flow meter 30, it is possible to detect the ice making amount per hour.

Figure 17:
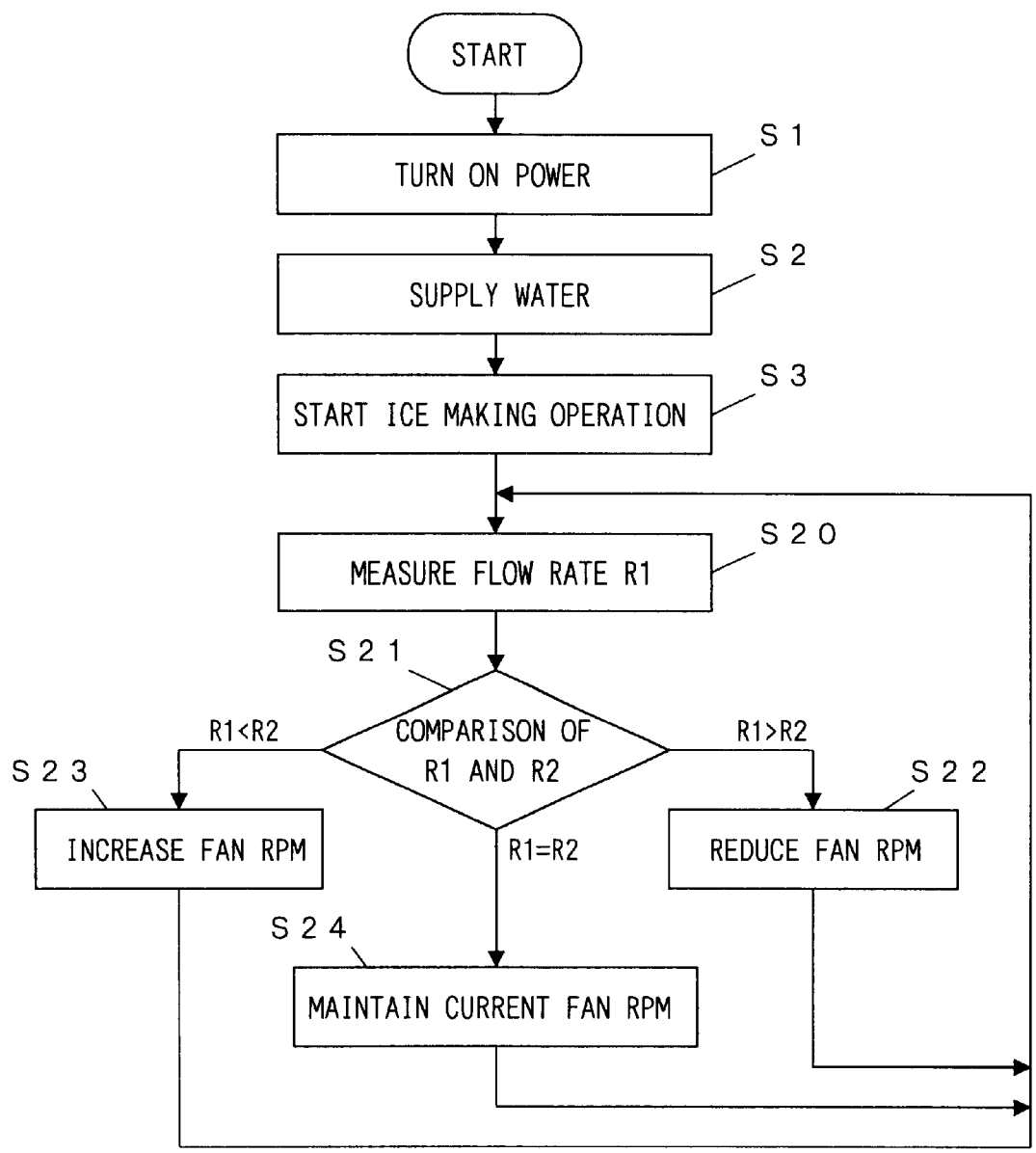
FIG. 17 is a flowchart illustrating the operation of Embodiment 7.

As shown in the flowchart of FIG. 17, in Embodiment 7, when ice making operation is started in step S3, the flow meter 30 starts in step S20 the measurement of the flow rate R1 of the ice making water, and, in step S21, the flow rate R1 is compared with a pre-set reference flow rate R2. When the result of the comparison indicates that the flow rate R1 is over the reference flow rate R2, the control circuit A determines that the auger type ice making machine 1 is in an excessive-ice-making state, and reduces in step S22 the RPM of the cooling fan motor 17 for the condenser 15 to lower the ice making capacity. When it is determined in step S21 that the flow rate R1 is less than the reference flow rate R2, the control circuit A determines that the auger type ice making machine has not attained a desired ice making amount, and increases in step S23 the RPM of the fan motor 17 for cooling the condenser 15 to thereby improve the ice making capacity. When it is determined in step S21 that the flow rate R1 is equal to the reference flow rate R2, the control circuit A maintains in step S24 the current RPM of the cooling fan motor 17. Thereafter, the procedure returns to step S20, and the operations of steps S20 through S24 are repeated.

Embodiment 8

Figure 18:
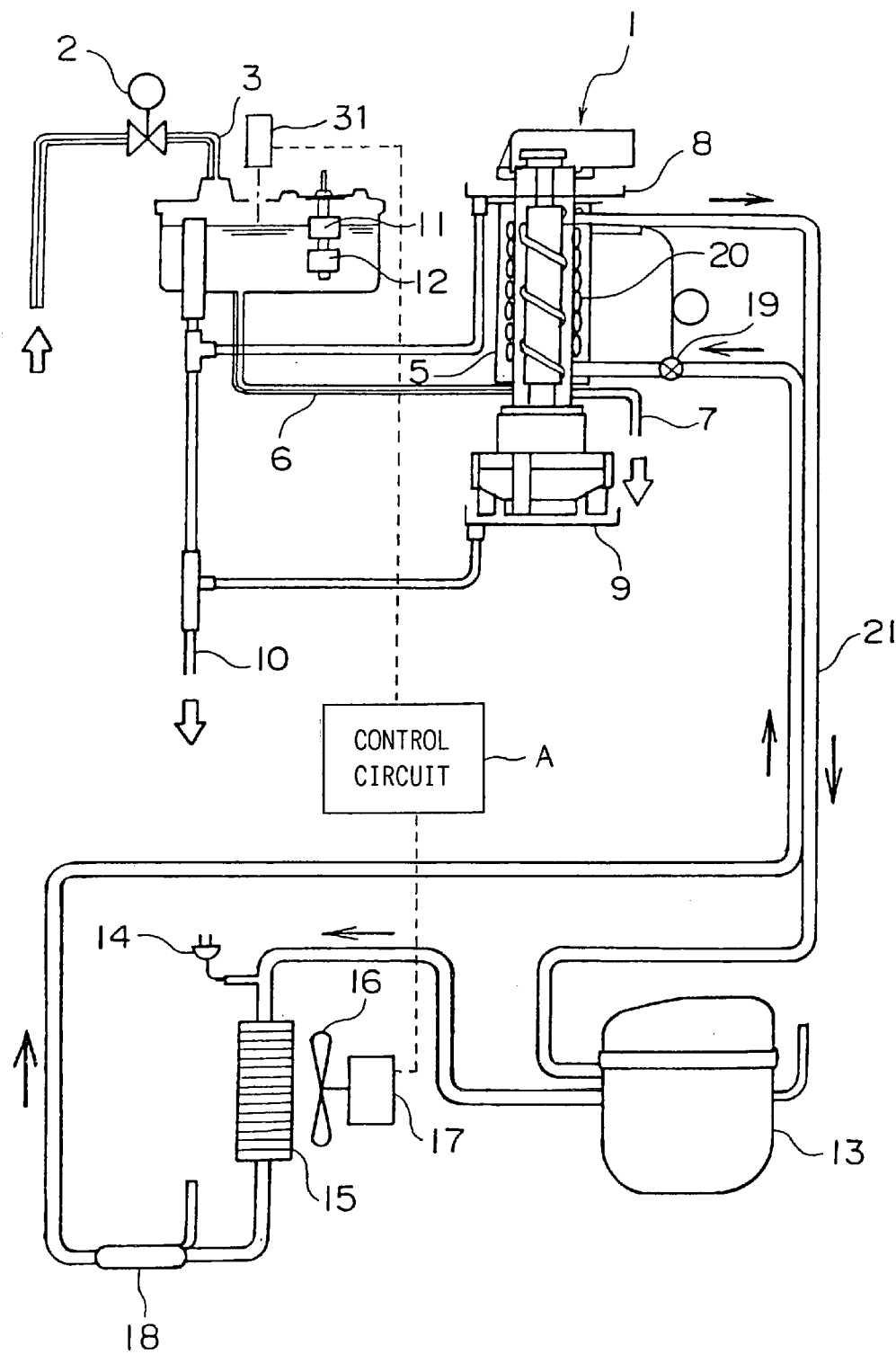
FIG. 18 is a schematic diagram showing the general construction of an auger type ice making machine according to Embodiment 8.

As shown in FIG. 18, in Embodiment 8, the water supply tank 4 of the ice making machine of Embodiment 1 is provided with a water level sensor 31 for detecting the water level of the ice making water; this water level sensor 31 constitutes the ice making capacity detecting means. The water level of the ice making water in the water supply tank 4 is lowered by the amount of water turned into ice by the cylinder 5 and discharged therefrom, so that by detecting the water level change amount H1 of the ice making water by the water level sensor 31, it is possible to detect the ice making amount per hour.

Figure 19:
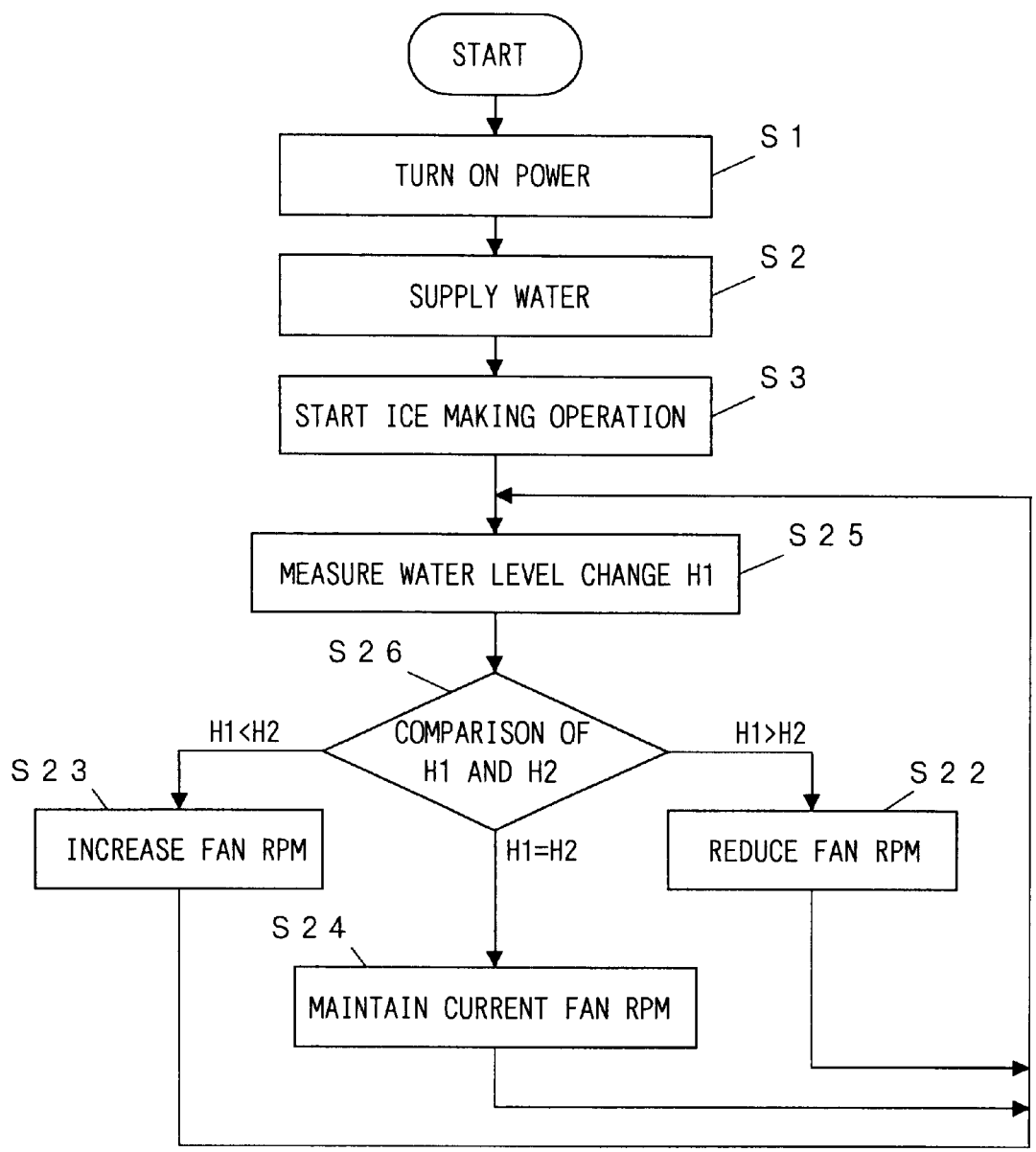
FIG. 19 is a flowchart illustrating the operation of Embodiment 8.

As shown in the flowchart of FIG. 19, in Embodiment 8, when ice making operation is started in step S3, the water level sensor 31 starts the measurement of the water level change amount H1 of the ice making water in step S25, and, in step S26, the water level change amount H1 is compared with a pre-set reference change amount H2. When it is determined, as a result of the comparison, that the water level change amount H1 is over the reference change amount H2, the control circuit A determines that the auger type ice making machine 1 is in an excessive-ice-making state, and reduces in step S22 the RPM of the fan motor 17 for cooling the condenser 15 to thereby lower the ice making capacity. When it is determined in step S26 that the water level change amount H1 is less than the reference change amount H2, the control circuit A determines that the auger type ice making machine 1 has not attained a desired ice making amount, and increases in step S23 the RPM of the fan motor 17 for cooling the condenser 15 to thereby improve the ice making capacity. When it is determined in step S26 that the water level change amount H1 is equal to the reference change amount H2, the control circuit A maintains in step S24 the current RPM of the cooling fan motor 17. Thereafter, the procedure returns to step S25.

Embodiment 9

Figure 20:
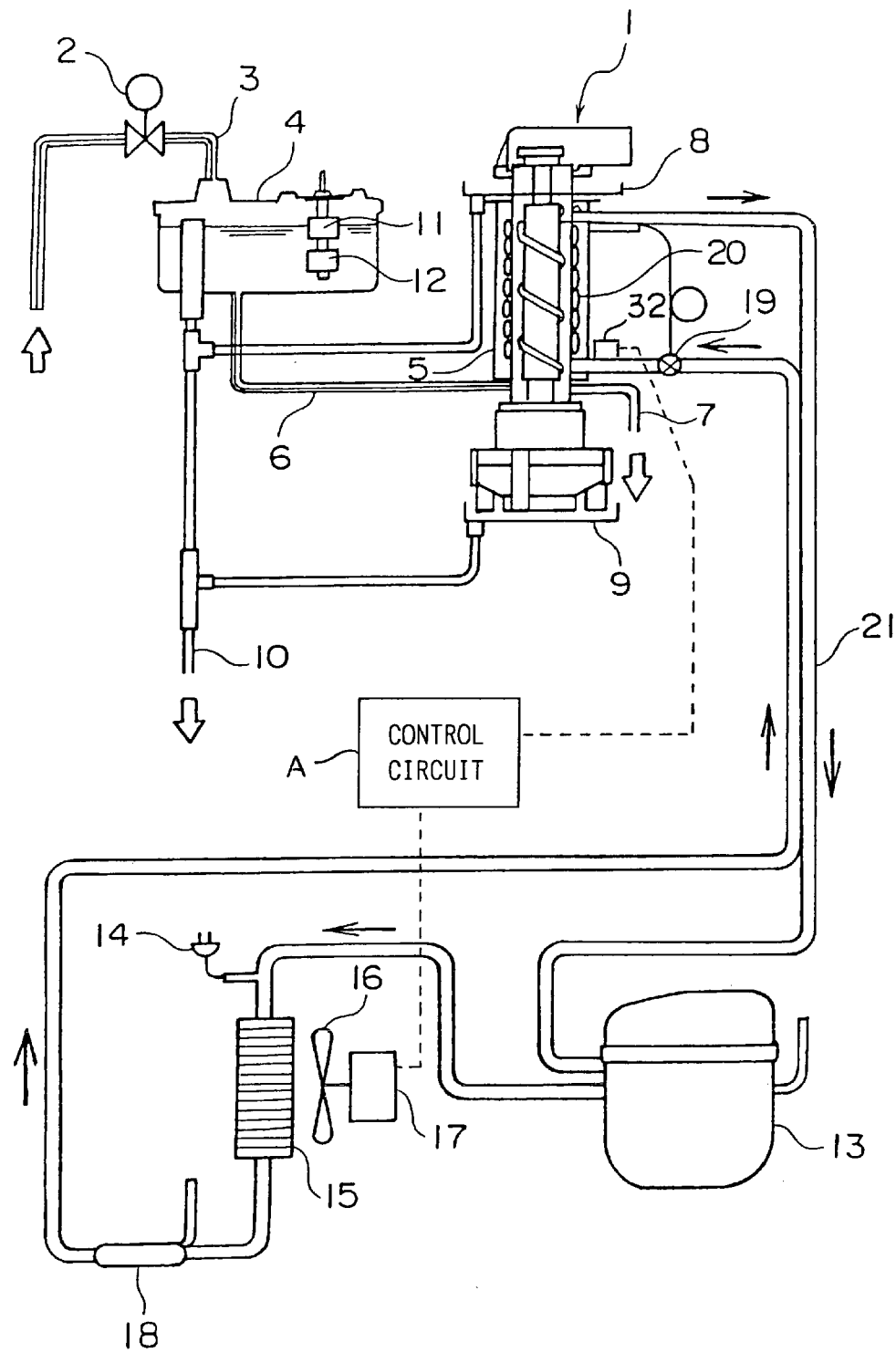
FIG. 20 is a schematic diagram showing the general construction of an auger type ice making machine according to Embodiment 9.
Figure 21:
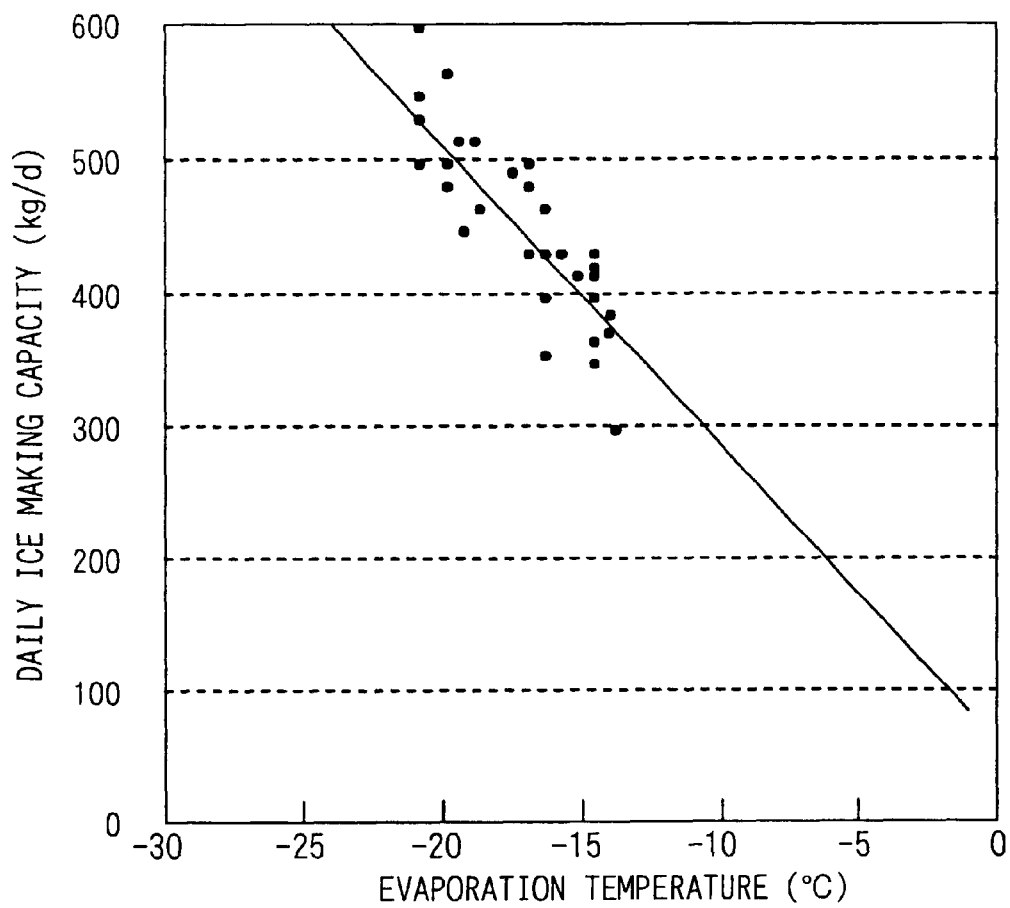
FIG. 21 is a graph showing the relationship between ice making capacity and refrigerant evaporation temperature.

As shown in FIG. 20, in Embodiment 9, a temperature sensor 32 is provided at the inlet of the evaporator 20 to measure the evaporation temperature ET1 of the refrigerant in the evaporator 20; the temperature sensor 32 constitutes the ice making capacity detecting means. As shown in FIG. 21, the evaporation temperature ET1 is in proportion to the ice making capacity; by detecting the evaporation temperature ET1, it is possible to detect the ice making amount per hour.

Figure 22:
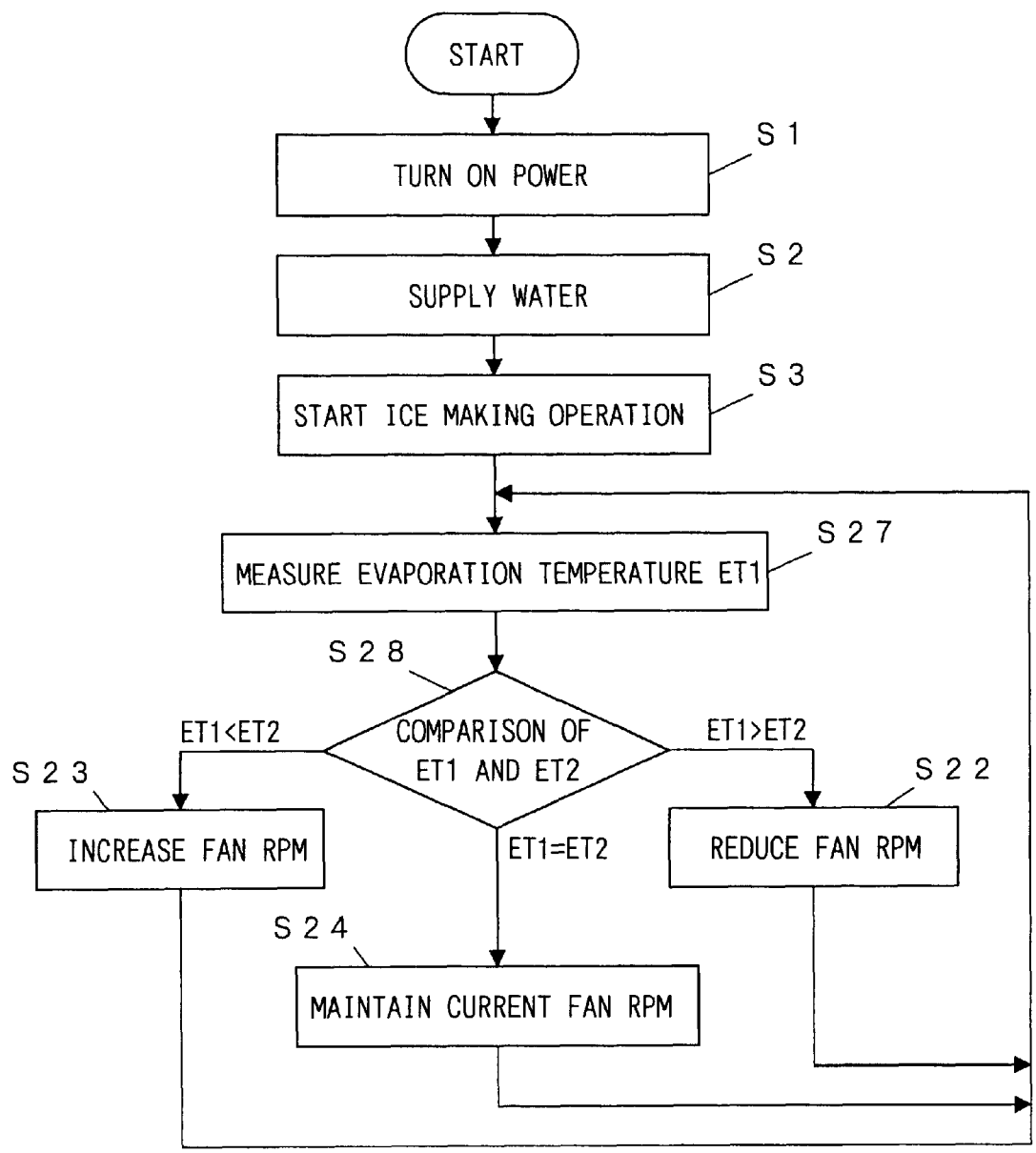
FIG. 22 is a flowchart illustrating the operation of Embodiment 9.

As shown in the flowchart of FIG. 22, in Embodiment 9, when ice making operation is started in step S3, the temperature sensor 32 starts the measurement of the evaporation temperature ET1 of the refrigerant in step S27, and, in step S28, the evaporation temperature ET1 is compared with a pre-set reference temperature ET2. When the comparison result shows that the evaporation temperature ET1 is lower than the reference temperature ET2, the control circuit A determines that the auger type ice making machine 1 is in an excessive-ice-making state, and reduces in step S22 the RPM of the fan motor 17 for cooling the condenser 15 to thereby lower the ice making capacity. When it is determined in step S28 that the evaporation temperature ET1 is higher than the reference temperature ET2, the control circuit A determines that the auger type ice making machine 1 has not attained a desired ice making amount, and increases in step S23 the RPM of the fan motor 17 for cooling the condenser 15 to thereby improve the ice making capacity. When it is determined in step S28 that the evaporation temperature ET1 is equal to the reference temperature ET2, the control circuit A maintains in step S24 the current RPM of the cooling fan motor 17. Thereafter, the procedure returns to step S27.

Embodiment 10

Figure 23:
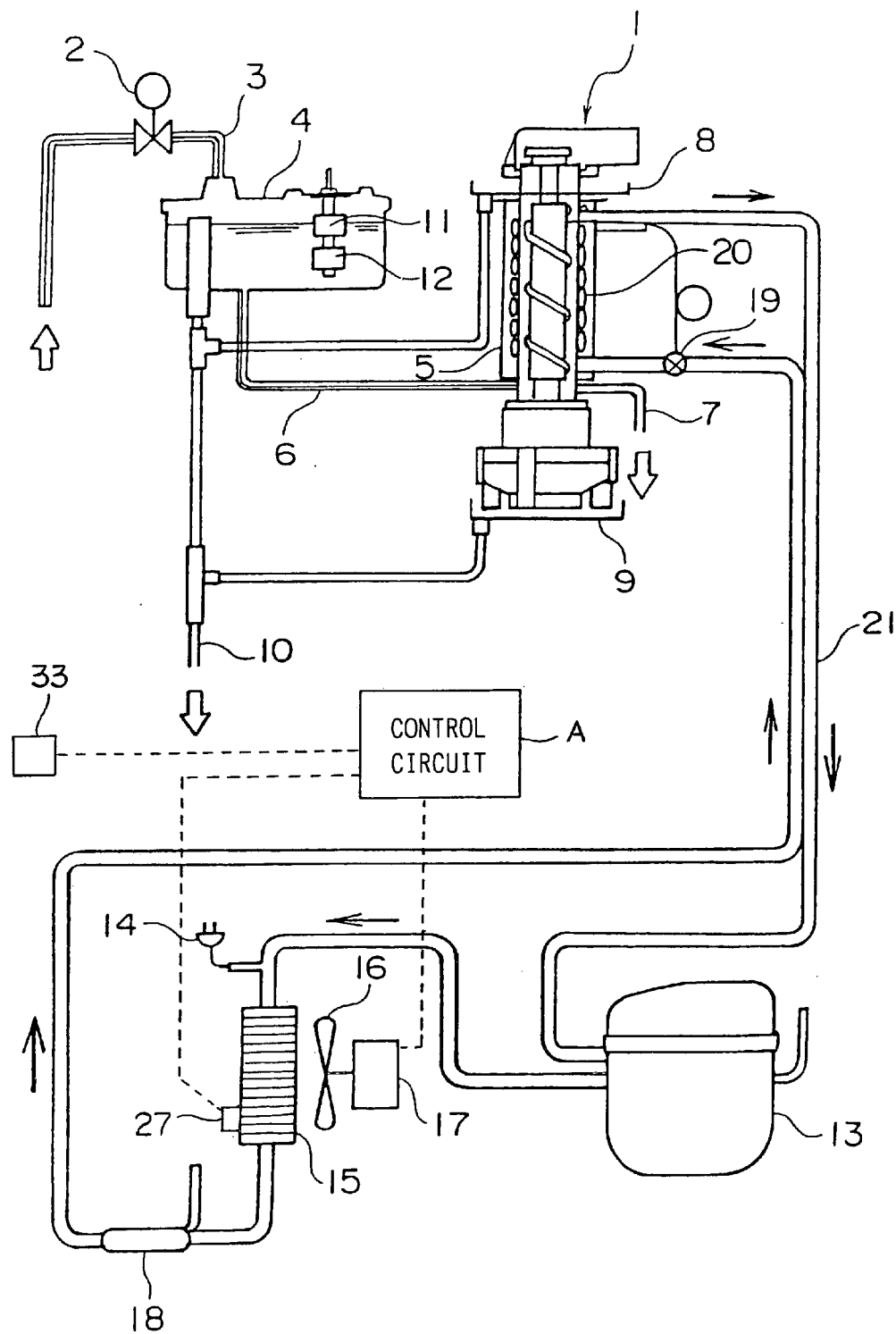
FIG. 23 is a schematic diagram showing the general construction of an auger type ice making machine according to Embodiment 10.

As shown in FIG. 23, in Embodiment 10, a temperature sensor 33 for measuring the atmospheric temperature AT is provided in the ice making machine of Embodiment 2; the ice making capacity detecting means of this invention is formed by this temperature sensor 33 and a temperature sensor 27 for detecting the temperature CT1 of the condenser 15. The control circuit A stores before hand a plurality of reference temperatures CT2 different from each other with respect to the condenser 15. The ice making capacity is influenced by the atmospheric temperature AT, so that, in addition to the RPM control performed on the cooling fan motor 17 on the basis of the temperature CT1 of the condenser 15, the reference temperature CT2 of the condenser 15 to be used in the RPM control is selected on the basis of the atmospheric temperature AT, whereby it is possible to appropriately control the ice making capacity according to the environment.

Figure 24:
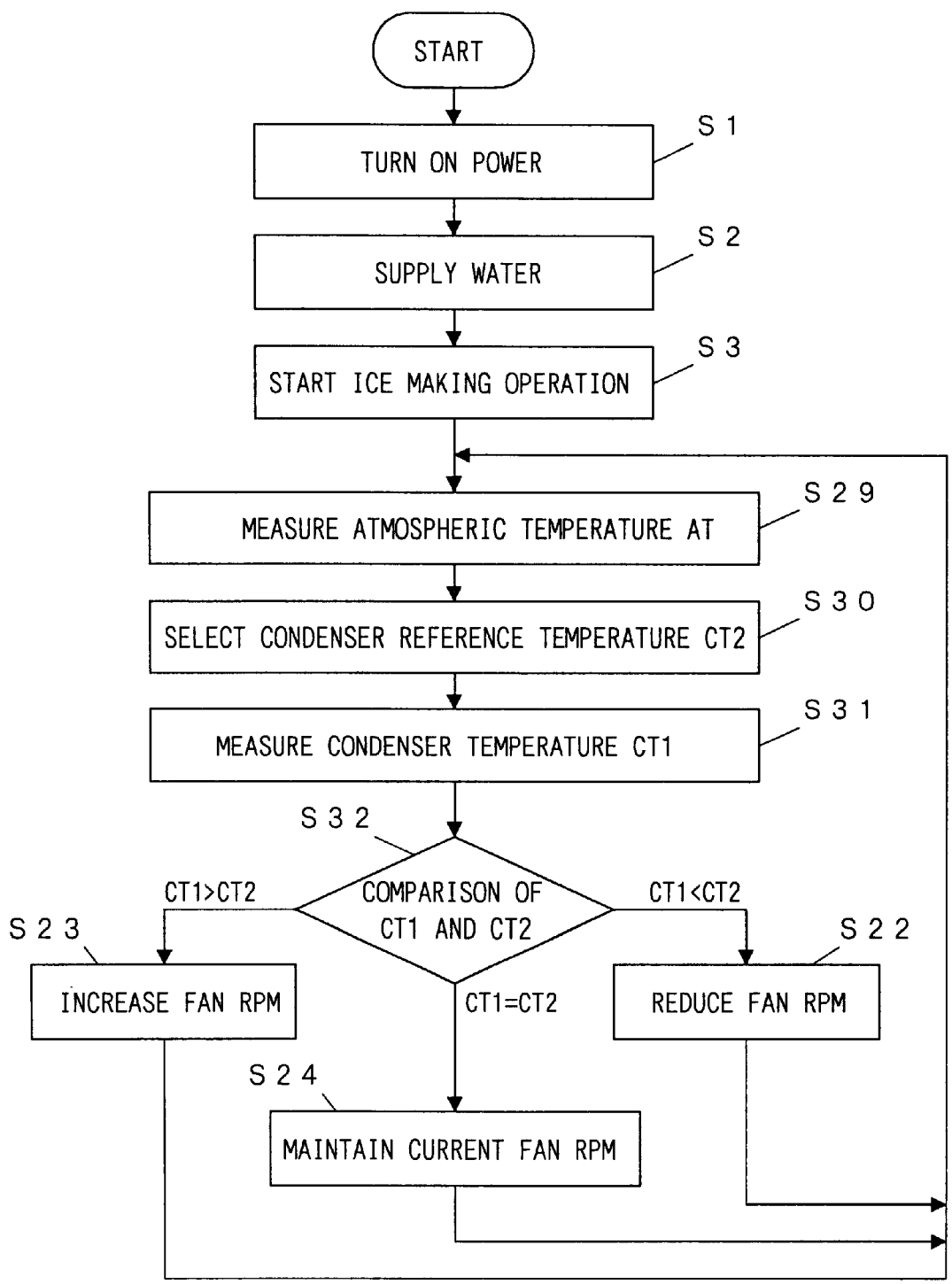
FIG. 24 is a flowchart illustrating the operation of Embodiment 10.

As shown in the flowchart of FIG. 24, in Embodiment 10, when ice making operation is started in step S3, the temperature sensor 33 measures the atmospheric temperature AT in step S29, and, in step 30, one reference temperature CT2 corresponding to the measurement value of the atmospheric temperature AT obtained by the temperature sensor 33 is selected from among the plurality of reference temperatures CT2 stored in the control circuit A beforehand in step S30. Further, in step S31, the temperature sensor 27 starts the measurement of the temperature CT1 of the condenser 15, and, in step S32, the temperature CT1 is compared with the selected reference temperature CT2. When the comparison result shows that the temperature CT1 is lower than the reference temperature CT2, the control circuit A determines that the auger type ice making machine 1 is in an excessive-ice-making state, and reduces in step S22 the RPM of the fan motor 17 for cooling the condenser 15 to thereby lower the ice making capacity. When it is determined in step S32 that the temperature CT1 is higher than the reference temperature CT2, the control circuit A determines that the auger type ice making machine has not attained a desired ice making amount, and increases in step S23 the RPM of the fan motor 17 of the condenser 15 to thereby improve the ice making capacity. When it is determined in step S32 that the temperature CT1 is equal to the reference temperature CT2, the control circuit A maintains in step S24 the current RPM of the cooling fan motor 17. Thereafter, the procedure returns to step S29.

As similar to Embodiment 10, the temperature sensor 33 for measuring the atmospheric temperature AT may be provided in each of the ice making machines of Embodiments 3–6 and 9 to adjust based on the detected atmospheric temperature AT the reference value A2 in Embodiment 3, the reference temperature CT2 in Embodiment 4, the reference value A2 in Embodiment 5, the reference temperature CT2 and the reference value A2 in Embodiment 6 and the reference temperature ET2 in Embodiment 9.

Embodiment 11

Figure 25:
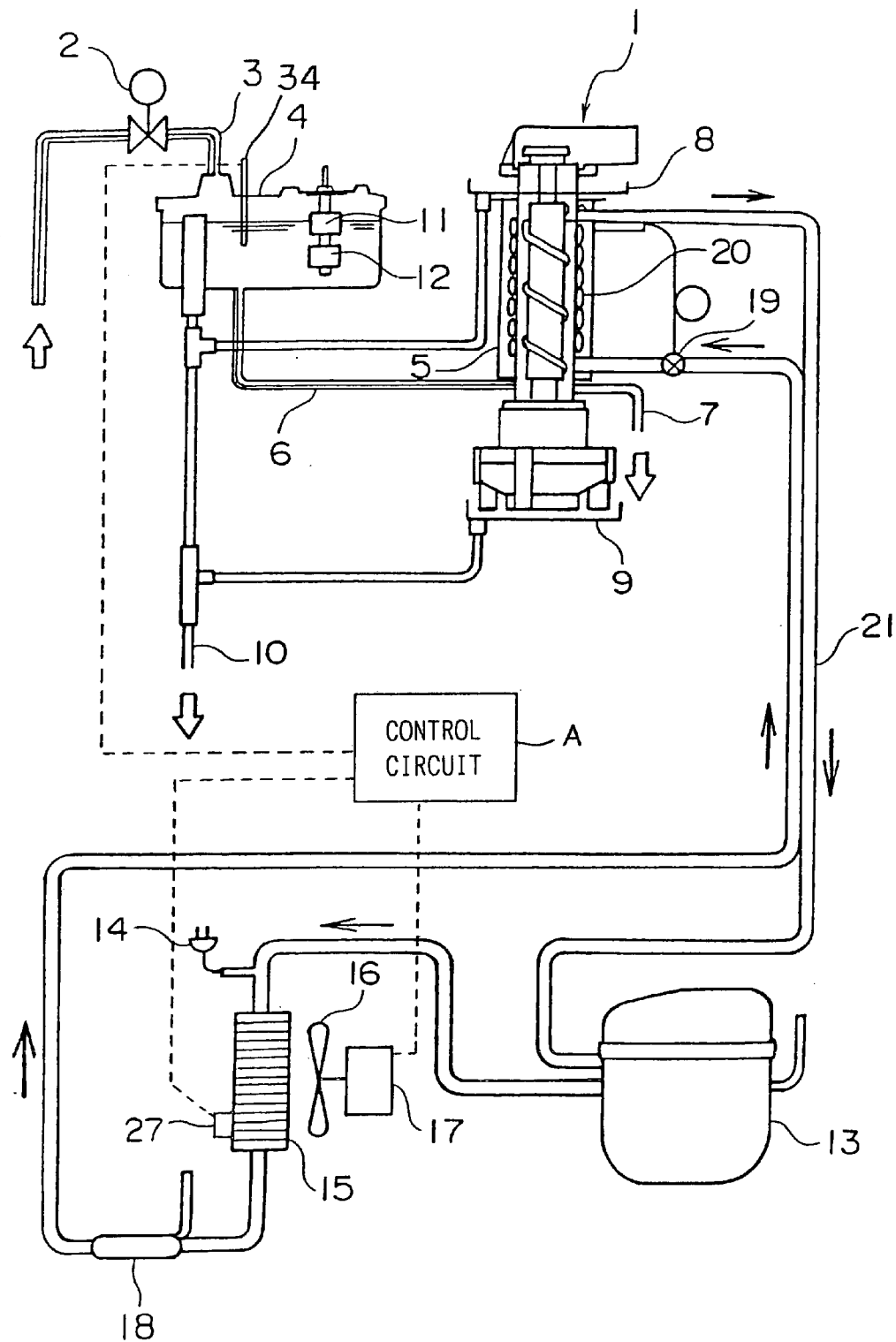
FIG. 25 is a schematic diagram showing the general construction of an auger type ice making machine according to Embodiment 11.

As shown in FIG. 25, in Embodiment 11, the ice making machine of Embodiment 2 is provided with a temperature sensor 34 for measuring the temperature WT of the ice making water in the water supply tank 4, and the ice making capacity detecting means is formed by this temperature sensor 34 and the temperature sensor 27 for detecting the temperature CT1 of the condenser 15. The control circuit A stores beforehand a plurality of different reference temperatures CT2 with respect to the condenser 15. The ice making capacity is influenced by the temperature WT of the ice making water used for ice making, so that, in addition to the RPM control performed on the cooling fan motor 17 on the basis of the temperature CT1 of the condenser 15, the reference temperature CT2 of the condenser 15 to be used in the RPM control is selected on the basis of the temperature WT of the ice making water, whereby it is possible to appropriately control the ice making capacity according to the environment.

Figure 26:
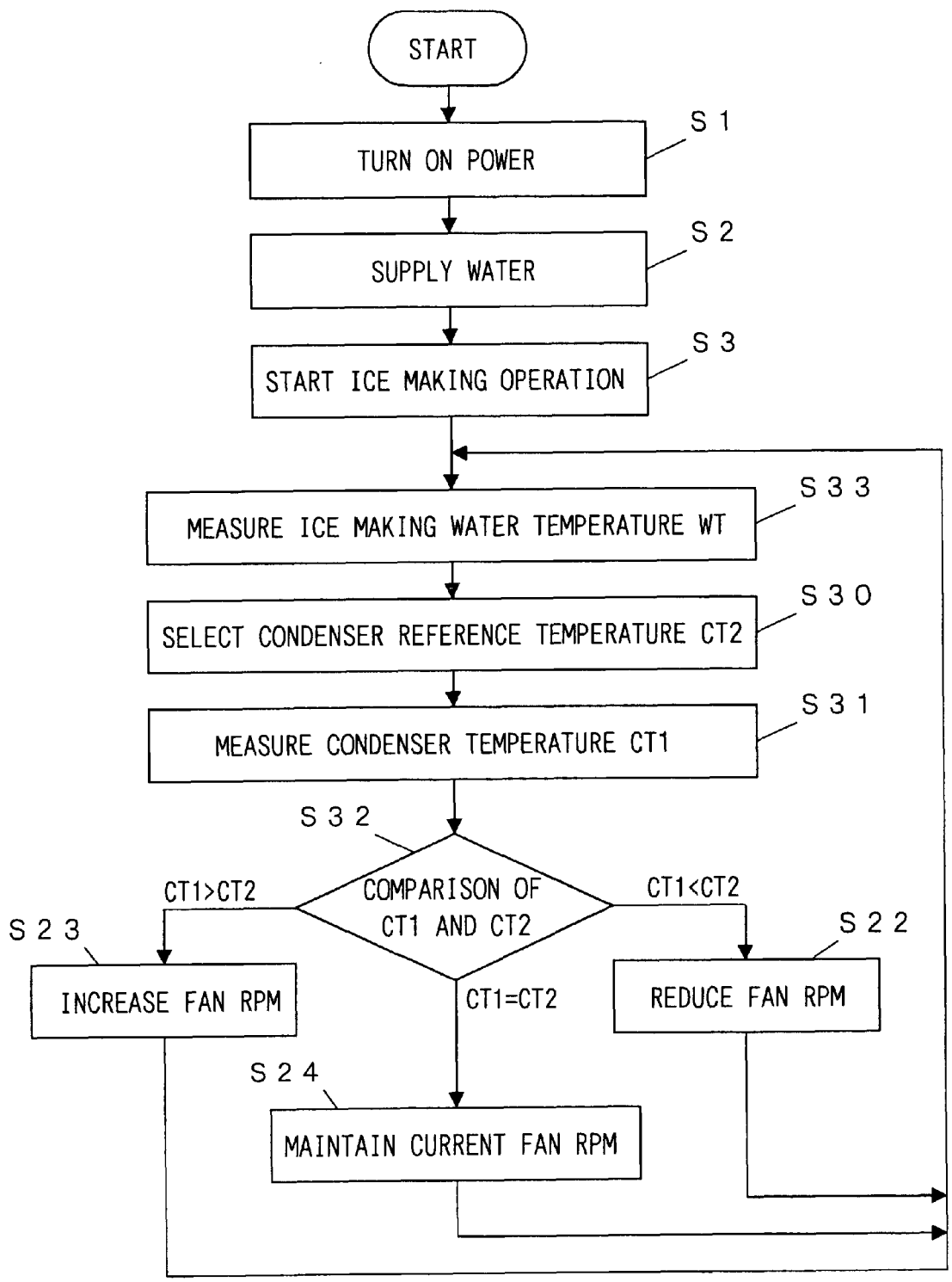
FIG. 26 is a flowchart illustrating the operation of Embodiment 11.

As shown in the flowchart of FIG. 26, in Embodiment 11, when ice making operation is started in step S3, the temperature sensor 34 measures the temperature WT of the ice making water in step S33, and, in step S30, one reference temperature CT2 corresponding to the measurement value of the temperature WT of the ice making water obtained by the temperature sensor 34 is selected from among the plurality of reference temperatures CT2 stored in the control circuit A beforehand. Further, in step S31, the temperature sensor 27 starts the measurement of the temperature CT1 of the condenser 15, and, in step S32, the temperature CT1 and the selected reference temperature CT2 are compared with each other. When the comparison result shows that the temperature CT1 is lower than the reference temperature CT2, the control circuit A determines that the auger type ice making machine 1 is in an excessive-ice-making state, and reduces in step S22 the RPM of the fan motor 17 for cooling the condenser 15 to thereby lower the ice making capacity. When it is determined in step S32 that the temperature CT1 is higher than the reference temperature CT2, the control circuit A determines that the auger type ice making machine 1 has not attained the desired ice making amount, and increases in step S23 the RPM of the fan motor 17 for cooling the condenser 15 to thereby improve the ice making capacity. When it is determined in step S32 that the temperature CT1 is equal to the reference temperature CT2, the control circuit A maintains in step S24 the current RPM of the cooling fan motor 17. Thereafter, the procedure returns to step S33.

As similar to Embodiment 11, the temperature sensor 34 for measuring the temperature WT of the ice making water in the water supply tank 4 may be provided in each of the ice making machines of Embodiments 3–6 and 9 to adjust based on the detected temperature WT the reference value A2 in Embodiment 3, the reference temperature CT2 in Embodiment 4, the reference value A2 in Embodiment 5, the reference temperature CT2 and the reference value A2 in Embodiment 6 and the reference temperature ET2 in Embodiment 9.

Figure 27:
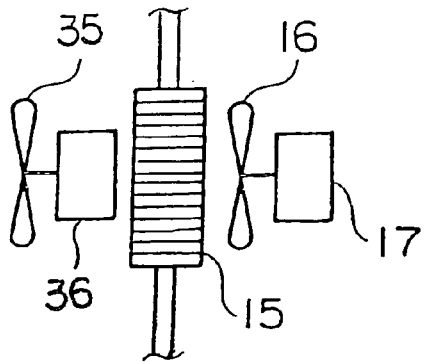
FIG. 27 is a diagram showing another method for adjusting ice making capacity.

As shown in FIG. 27, in Embodiments 1 through 11, it is also possible to respectively arrange cooling fans 16 and 35 in front of and behind the condenser 15 and to independently drive them by the fan motors 17 and 36, respectively. This arrangement allows switching between the following four modes:

(1) Full-speed operation of both fan motors;
(2) Full-speed operation of one fan motor and RPM control on the other fan motor;
(3) RPM control on both fan motors; and
(4) RPM control on one fan motor with the other fan motor at rest.

Due to this arrangement, it is possible to maintain a fixed level of ice making capacity even if, for example, the atmospheric temperature fluctuates greatly.

Figure 28:
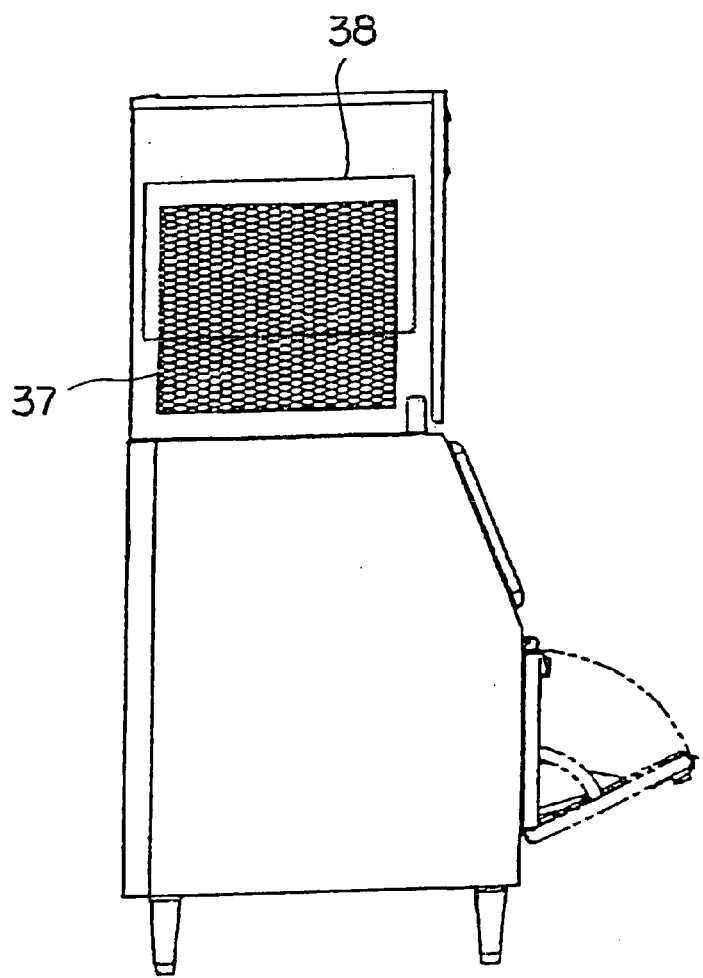
FIG. 28 is a diagram showing still another method for adjusting ice making capacity.

While in the above-described embodiments RPM control is performed on the fan motor 17 in order to control the condensation capacity of the condenser 15, this should not be construed restrictively. It is also possible, as shown in FIG. 28, to control the condensation capacity by blocking a desired area of an exhaust heat port 37 of the ice making machine with a masking plate 38. The larger the area of the exhaust heat port 37 blocked by the masking plate 38, the lower the condensation capacity, and the lower the ice making capacity. To the peripheral edge portion of the masking plate 38, a magnet is mounted by an adhesive double coated tape or the like. Due to this magnet, the masking plate 38 can be easily attached to the outer surface of the ice making machine. Solely by varying the attachment position for the masking plate 38, it is possible to adjust the condensation capacity.

In particular, in the winter, when the atmospheric temperature is low, the ice making capacity of the auger type ice making machine is likely to become excessive, which leads to an increase in the load on the cylinder, resulting in generation of unusual noise from the cylinder. In such cases, generation of unusual noise can be easily prevented solely by blocking a part of the exhaust heat port 37 with the masking plate 38.

When there is no need to use the masking plate 38, the masking plate 38 is just attached to some outer surface portion of the ice making machine other than the exhaust heat port 37 and is thus stored.

While in Embodiments 1 through 11, the freezing capacity of the freezing circuit is adjusted by controlling the RPM of the fan motor 17 for cooling the condenser 15, it is also possible to control the RPM of the compressor 13.

Figure 29:
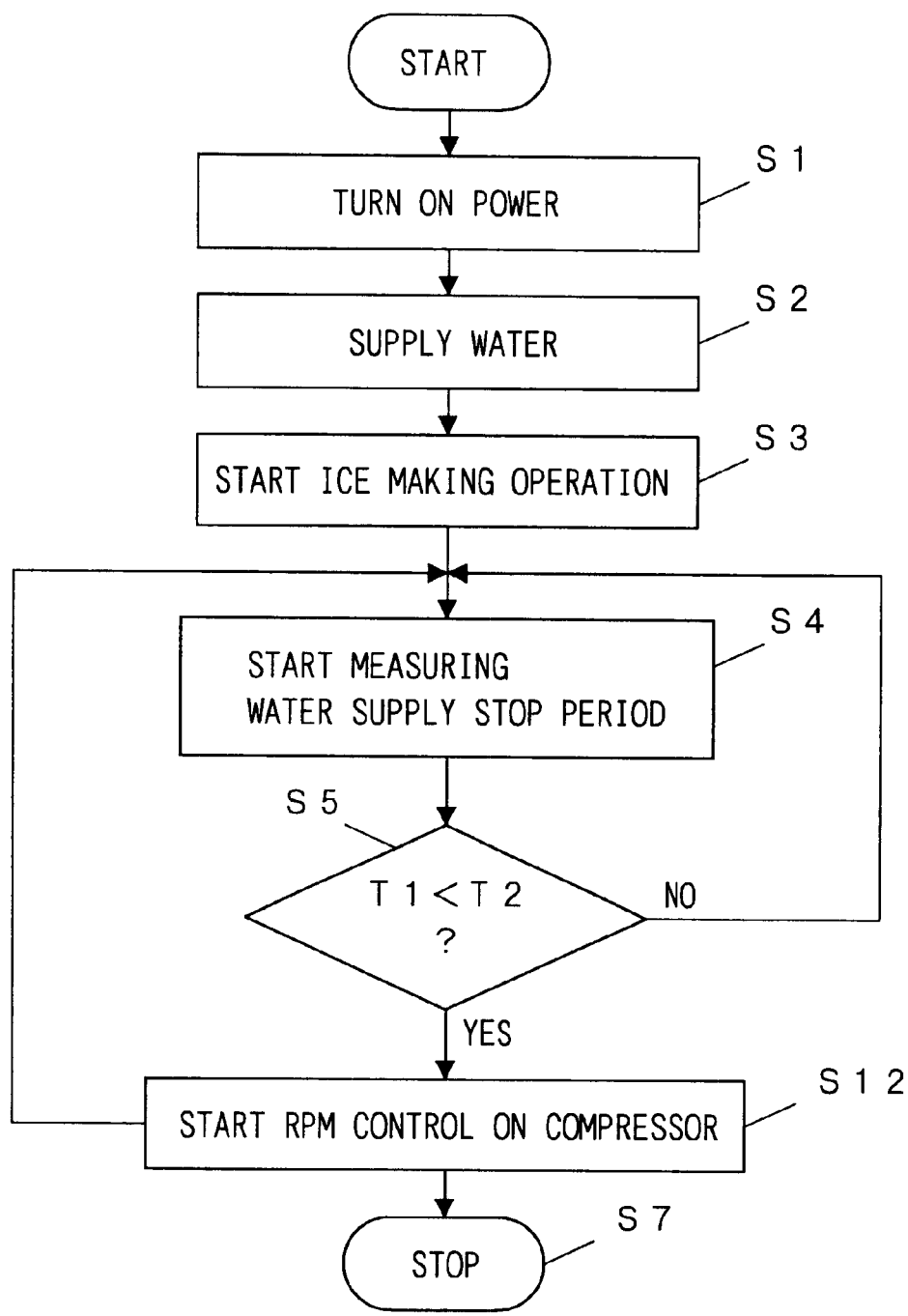
FIG. 29 is a flowchart illustrating the operation of a modification of Embodiment 1.

That is, as shown in FIG. 29 in correspondence with Embodiment 1, when in step S5 the water-supply-stop time T1 is lower than the reference time T2, RPM control is started on the compressor 13 in step S12, making it possible to perform control so as to reduce the RPM of the compressor 13. Thus, when it is determined that the auger type ice making machine is overloaded, the compressing capacity is lowered on purpose to thereby restrain excessive ice making.

Figure 30:
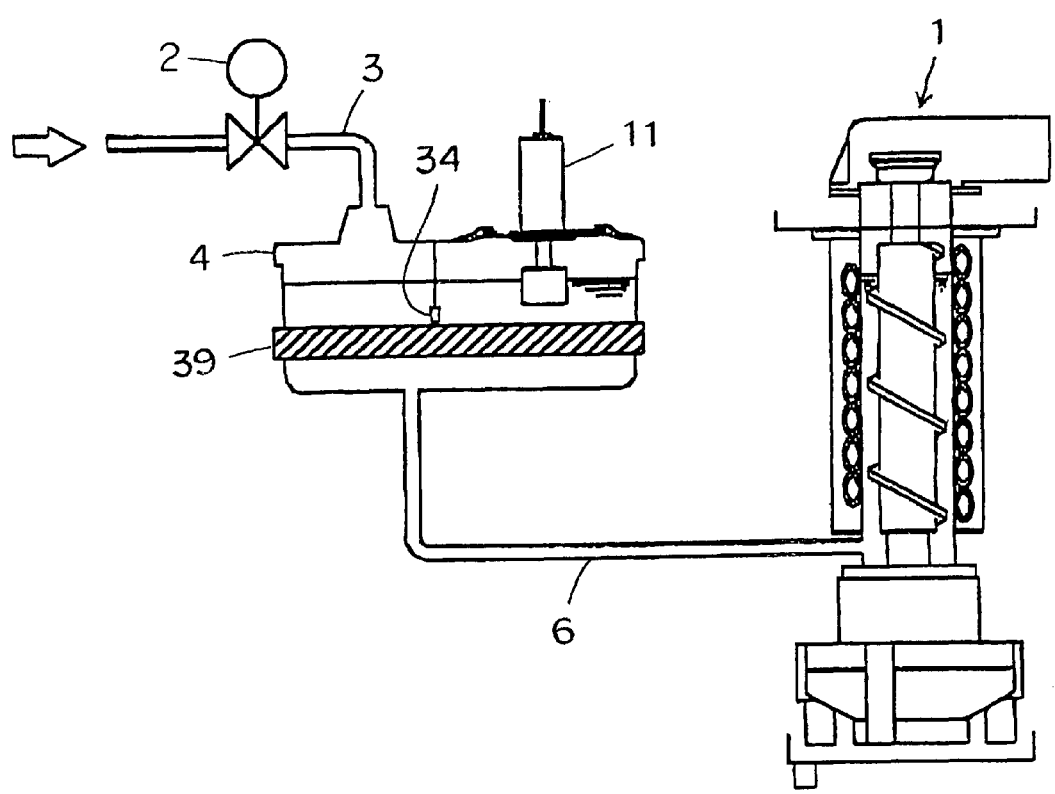
FIG. 30 is a diagram showing another method for adjusting ice making capacity.
Figure 31:
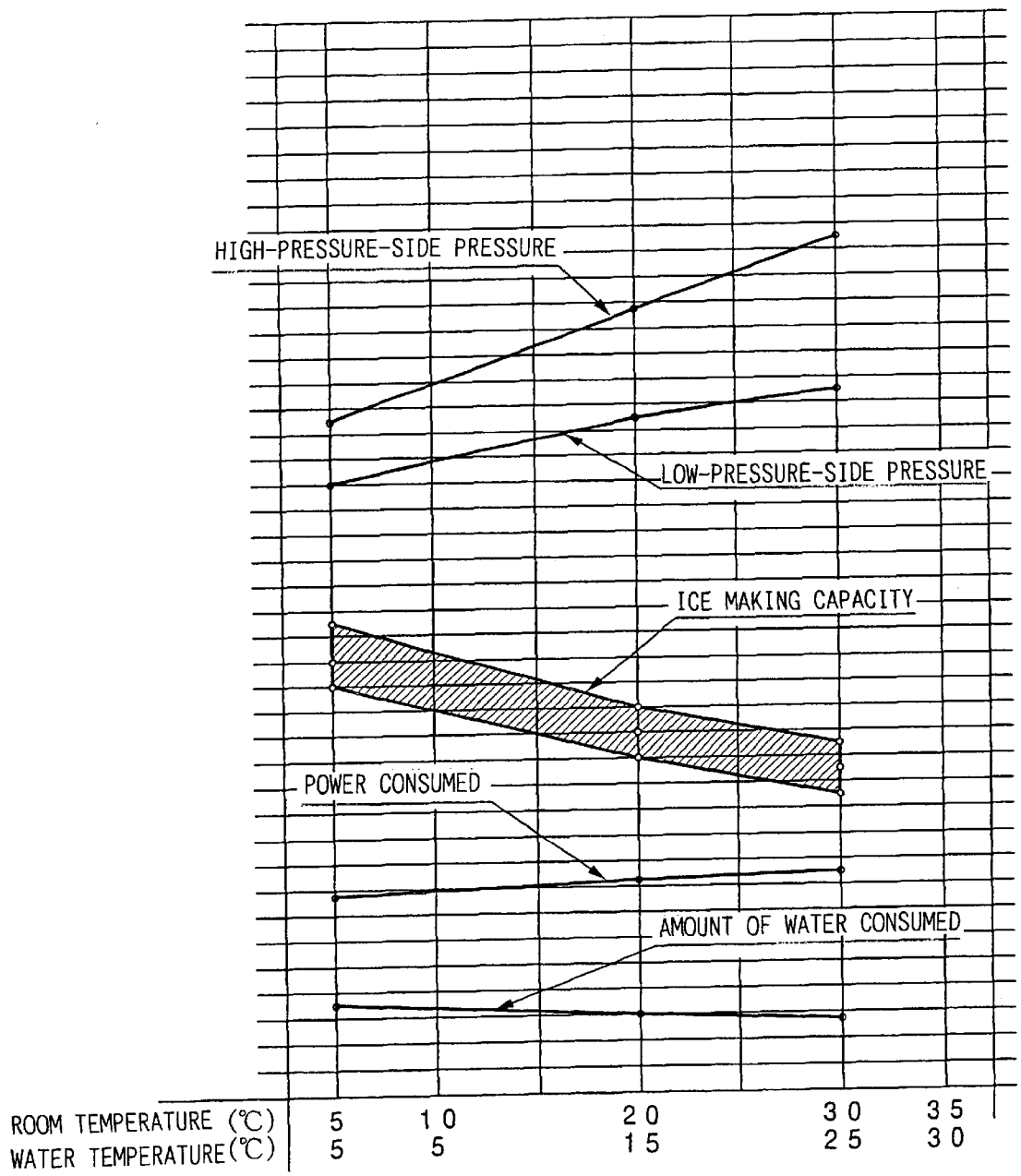
FIG. 31 is a capacity chart for a conventional apparatus.

The lower the temperature WT of the ice making water is, the higher the ice making capacity becomes. Accordingly, an ice making machine can be constructed such that the water supply tank 4 is equipped with the temperature sensor 34 and a heater 39 as shown in FIG. 30, and when the temperature WT of the ice making water detected by the temperature sensor 34 is lower than a predetermined value, the ice making water is heated by the heater 39. For example, the heater 39 is turned ON when the temperature WT is lower than 10° C. while the heater 39 is turned OFF when the temperature WT rises up to 20° C. Thus, when the temperature WT of the ice making water is low, the ice making capacity is lowered to avoid excessive ice making, whereby it is possible to prevent unusual noise from generated.

Further, it is possible to stabilize the ice making capacity by maintaining the temperature WT of the ice making water at a constant value. The heater 39 should be controlled so as to keep the temperature WT of the ice making water detected by the temperature sensor 34 to be a predetermined value. If the predetermined value is set to a usual temperature of supplied water such as 20° C., it is necessary to cool water until its temperature is lowered to the predetermined value when water having a temperature of 30° C. is supplied. Therefore, the predetermined value is desired to be set to a temperature such as 50° C. higher than the usual temperature of supplied water. In this case, it is not necessary to cool water and the temperature WT of the ice making water can be maintained at a constant value by only using the heater 39. Thus, the ice making capacity can be stabilized and generation of unusual noise can be prevented.

When applying this invention to a closed-cell type ice making machine, it is possible to detect any fluctuation in the ice making capacity on the basis of the number of times that a water supply valve for supplying water to the ice making water tank formed integrally with an ice making water plate is opened and closed per predetermined length of time, or on the basis of the number of times that the ice making water plate ascends and descends per predetermined length of time.

When applying this invention to a flow-down type ice making machine, it is possible to detect any fluctuation in ice making capacity on the basis of ice making time and ice removal time.

As described above, in accordance with this invention, fluctuation in the ice making capacity of an ice making machine is detected by an ice making capacity detecting means; when any fluctuation in the ice making capacity is detected, a control circuit adjusts the freezing capacity of a freezing circuit, whereby an excess in ice making capacity is eliminated, consumption of electric power and water is reduced, and failure or breakage of the ice making mechanism portion is prevented to thereby achieve an increase in service life.

What is claimed is:
1. An ice making machine comprising:
   an ice making portion;
   a water supply tank for supplying ice making water to the ice making portion;

a freezing circuit including an evaporator for cooling ice making water supplied to the ice making portion to make ice;

consumption time detecting means for detecting time in which a fixed amount of ice making water is consumed; and a control circuit which compares the consumption time detected by the consumption time detecting means with a reference time and adjusts the freezing capacity of the freezing circuit when the detected consumption time is shorter than the reference time.

2. An ice making machine according to claim 1, wherein the ice making capacity detecting means detects fluctuation in ice making capacity by comparing the temperature of a condenser of the freezing circuit with a reference value.

3. An ice making machine according to claim 1, wherein the ice making capacity detecting means detects fluctuation in ice making capacity by comparing the compression ratio of a compressor of the freezing circuit with a reference value.

4. An ice making machine according to claim 1, wherein the ice making capacity detecting means detects fluctuation in ice making capacity by comparing the time in which a fixed amount of ice making water is consumed and at least one of the temperature of a condenser of the freezing circuit and the compression ratio of a compressor of the freezing circuit with reference values, respectively.

5. An ice making machine according to claim 1, wherein the ice making capacity detecting means detects fluctuation in ice making capacity by comparing the evaporation temperature of refrigerant of an evaporator of the freezing circuit with a reference value.

6. An ice making machine according to claim 1, wherein the ice making capacity detecting means detects fluctuation in ice making capacity by comparing the flow rate of the ice making water supplied to the ice making portion with a reference value.

7. An ice making machine according to claim 1, wherein the ice making capacity detecting means detects fluctuation in ice making capacity by comparing the change in the level of the ice making water in the water supply tank with a reference value.

8. An ice making machine according to claim 1, wherein the ice making capacity detecting means adjusts the reference value on the basis of one of the atmospheric temperature and the temperature of the ice making water.

9. An ice making machine according to claim 2, wherein the ice making capacity detecting means adjusts the reference value on the basis of one of the atmospheric temperature and the temperature of the ice making water.

10. An ice making machine according to claim 3, wherein the ice making capacity detecting means adjusts the reference value on the basis of one of the atmospheric temperature and the temperature of the ice making water.

11. An ice making machine according to claim 4, wherein the ice making capacity detecting means adjusts the reference value on the basis of one of the atmospheric temperature and the temperature of the ice making water.

12. An ice making machine according to claim 5, wherein the ice making capacity detecting means adjusts the reference value on the basis of one of the atmospheric temperature and the temperature of the ice making water.

13. An ice making machine according to claim 6, wherein the ice making capacity detecting means adjusts the reference value on the basis of one of the atmospheric temperature and the temperature of the ice making water.

14. An ice making machine according to claim 7, wherein the ice making capacity detecting means adjusts the reference value on the basis of one of the atmospheric temperature and the temperature of the ice making water.

15. An ice making machine according to claim 1, wherein the control circuit adjusts the RPM of a fan motor for a condenser of the freezing circuit.

16. An ice making machine according to claim 1, wherein the control circuit adjusts the RPM of a compressor of the freezing circuit.

* * * * *